(12) United States Patent
Obayashi et al.

(10) Patent No.: US 11,926,272 B2
(45) Date of Patent: Mar. 12, 2024

(54) POWER SUPPLY SYSTEM FOR MOBILE OBJECT

(71) Applicant: DENSO CORPORATION, Kariya (JP)

(72) Inventors: Kazuyoshi Obayashi, Kariya (JP); Naoki Katayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 269 days.

(21) Appl. No.: 17/472,934

(22) Filed: Sep. 13, 2021

(65) Prior Publication Data

US 2021/0402939 A1 Dec. 30, 2021

Related U.S. Application Data

(63) Continuation of application No. PCT/JP2020/001280, filed on Jan. 16, 2020.

(30) Foreign Application Priority Data

Mar. 14, 2019 (JP) ................. 2019-047419

(51) Int. Cl.
*H02J 9/06* (2006.01)
*B60R 16/03* (2006.01)
*B60R 16/033* (2006.01)
*H02J 7/00* (2006.01)

(52) U.S. Cl.
CPC ........ *B60R 16/033* (2013.01); *B60R 16/0315* (2013.01); *H02J 7/0063* (2013.01); *H02J 7/007* (2013.01); *H02J 9/061* (2013.01); *H02J 9/068* (2020.01); *H02J 7/0024* (2013.01)

(58) Field of Classification Search
CPC ... B60R 16/033; B60R 16/0315; B60R 16/03; H02J 7/0063; H02J 7/007; H02J 9/061; H02J 9/068; H02J 7/0024; H02J 7/34
See application file for complete search history.

(56) References Cited

U.S. PATENT DOCUMENTS

| 5,808,371 | A | 9/1998 | Kon'i et al. |
|---|---|---|---|
| 5,917,249 | A | 6/1999 | Kon'i et al. |
| 6,020,811 | A | 2/2000 | Saito et al. |
| 6,166,453 | A | 12/2000 | Kon'i et al. |
| 6,182,807 | B1 | 2/2001 | Saito et al. |
| 6,243,018 | B1 | 6/2001 | Saito et al. |
| 6,401,891 | B1 | 6/2002 | Saito et al. |
| 2001/0028241 | A1 | 10/2001 | Saito et al. |
| 2002/0043964 | A1 | 4/2002 | Saito et al. |
| 2003/0001434 | A1 | 1/2003 | Saito et al. |

(Continued)

*Primary Examiner* — Lincoln D Donovan
*Assistant Examiner* — Alex W Lam
(74) *Attorney, Agent, or Firm* — Oliff PLC

(57) ABSTRACT

A power supply system for a mobile object, includes a normal power supply, a normal current path connected to the normal power supply, a redundant power supply, a redundant current path connected to the redundant power supply. The power supply system further includes a first current path connected to a first redundant load, and a second current path disposed in parallel with the first current path and connected to a second redundant load. The power supply system further includes a path switch including a first normal switch and a second normal switch, and a controller controlling the path switch. The normal power supply is connected to a normal load, and is connectable to at least one of the first redundant load and the second redundant load.

12 Claims, 11 Drawing Sheets

(56) References Cited

U.S. PATENT DOCUMENTS

| | | |
|---|---|---|
| 2004/0227402 A1 | 11/2004 | Fehr et al. |
| 2005/0168072 A1 | 8/2005 | Saito et al. |
| 2017/0225635 A1 | 8/2017 | Obayashi et al. |
| 2018/0126866 A1 | 5/2018 | Nozawa |
| 2018/0290607 A1 | 10/2018 | Hida et al. |
| 2020/0094758 A1* | 3/2020 | Kawakami ............ B60R 16/033 |

* cited by examiner

POWER SUPPLY SYSTEM FOR MOBILE OBJECT

CROSS REFERENCE TO RELATED APPLICATIONS

The present application is a continuation application of International Patent Application No. PCT/JP2020/001280 filed on Jan. 16, 2020, which designated the U.S. and claims the benefit of priority from Japanese Patent Application No. 2019-047419 filed on Mar. 14, 2019. The entire disclosures of all of the above applications are incorporated herein by reference.

TECHNICAL FIELD

The present disclosure relates to a power supply system for a mobile object.

BACKGROUND

A power supply apparatus for a vehicle for example has a power supply line wired in a loop in the vehicle. A battery is connected to the looped power supply line so as to input power. Further, various modules are connected to the looped power supply line to be supplied with the power.

Such a power supply apparatus is, for example disclosed in JP 2001-328494 A, and the contents of JP 2001-328494A are incorporated by reference as explanation of technical elements in this specification.

SUMMARY

A power supply system for a mobile object, includes a normal power supply, a normal current path connected to the normal power supply, a redundant power supply, a redundant current path connected to the redundant power supply. The power supply system further includes a first current path connected to a first redundant load, and a second current path disposed in parallel with the first current path and connected to a second redundant load. The power supply system further includes a path switch including a first normal switch and a second normal switch, and a controller controlling the path switch. The normal power supply is connected to a normal load, and is connectable to at least one of the first redundant load and the second redundant load.

BRIEF DESCRIPTION OF DRAWINGS

Features and advantages of the present disclosure will become more apparent from the following detailed description made with reference to the accompanying drawings, in which.

DETAILED DESCRIPTION

Figure 1:
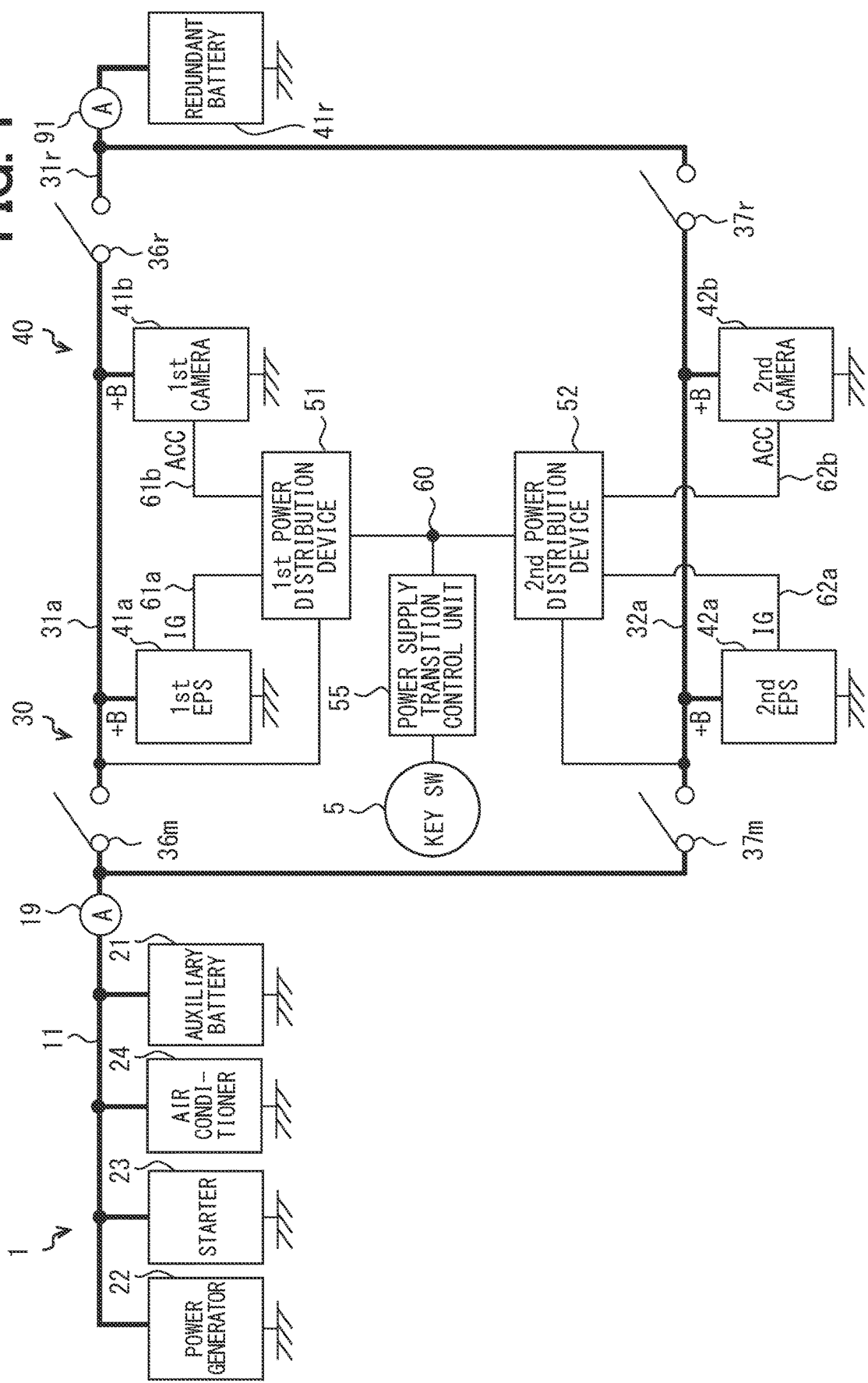
FIG. 1 is a diagram showing a schematic configuration of a power supply system for a mobile object according to a first embodiment.

In a power supply system in which a battery as a power supply and multiple modules as loads are connected to a looped power supply line, many switches and many power supply lines may be required as a countermeasure for a situation where an abnormality, such as a ground fault, has occurred on a current path electrically conducted with the battery, or a situation where an abnormality has occurred on a current path electrically conducted with a load which is essential for the safe movement of a mobile object. In other words, the power supply system is likely to be complicated in order to increase the redundancy of the power supply system. From the viewpoint described above or from other unmentioned viewpoints, there is demand for further improvement to the power supply system for a mobile object.

The present disclosure provides a mobile power supply system with a simple configuration and enhanced redundancy.

According to an aspect of the present disclosure, a power supply system for a mobile object includes: a normal power supply, a normal current path, a redundant power supply, a redundant current path, a first current path, a second current path, a path switch, and a controller. The normal power supply is configured to supply electric power to a normal load. The normal current path is connected to the normal power supply. The redundant power supply is a power supply different from the normal power supply, and configured to supply electric power to a redundant load that includes a first redundant load and a second redundant load. The redundant current path is connected to the redundant power supply. The first current path is provided between the normal current path and the redundant current path, and connected to the first redundant load. The second current path is disposed in parallel with the first current path, between the normal current path and the redundant current path, and connected to the second redundant load. The path switch includes a first normal switch and a second normal switch. The first normal switch is configured to switch a state of connection between the normal current path and the first current path, and the second normal switch is configured to switch a state of connection between the normal current path and the second current path. The controller is configured to control to turn on and off the path switch. The normal power supply is connected to the normal load, and is connectable to at least one of the first redundant load and the second redundant load.

According to the power supply system having the above-described configuration, the normal power supply is connected to the normal load and can be connected to at least one of the first redundant load and the second redundant load. Therefore, the normal power supply can be used to supply the electric power to the first redundant load and/or the second redundant load, in addition to the normal load. Therefore, it is possible to secure a large amount of electric power supply to the redundant load, as compared with a case where electric power is not supplied to the first redundant load and the second redundant load from the normal power supply. In other words, the normal power supply can be effectively used as a power supply for increasing the redundancy of the redundant load. Accordingly, it is possible to provide a power supply system for a mobile object with a simple configuration and enhanced redundancy.

Embodiments of the present disclosure will be hereinafter described with reference to the drawings. In some embodiments, functionally and/or structurally corresponding and/or associated parts may be given the same reference numerals, or reference numerals with different digit placed on equal to or higher than a hundred place. For corresponding parts and/or associated elements, it is possible to make reference to the description of other embodiments.

First Embodiment

A power supply system 1 is a system for supplying electric power to a mobile object having a plurality of electrical loads, which are driven by electric power. The power supply system 1 can be referred to as a power supply system for a mobile object, or a mobile power supply system. The mobile power supply system 1 can be mounted on an automobile that is driven by using a prime mover such as an engine or a motor for travelling. In the following, a case where the mobile power supply system 1 is mounted on an automobile will be described as an example. However, the mobile object is not limited to vehicles such as automobiles and motorcycles, and may be ships, aircraft, transportation equipment, and the like.

In FIG. 1, the mobile power supply system 1 includes an auxiliary battery 21, an electric power generator 22, and a redundant battery 41$r$. The auxiliary battery 21 and the redundant battery 41$r$ are devices for storing electric power which is to be supplied to an electrical device as an electrical load. The auxiliary battery 21 and the redundant battery 41$r$ are DC voltage sources that can be charged and discharged. The rated voltage of each of the auxiliary battery 21 and the redundant battery 41$r$ is, for example, 12V. As each of the auxiliary battery 21 and the redundant battery 41$r$, a secondary battery such as a lead storage battery, a nickel hydrogen battery, or a lithium ion battery, or a capacitor can be used. The auxiliary battery 21 is a battery having a larger storage capacity than the redundant battery 41$r$. The storage capacity of the auxiliary battery 21 is, for example, 50 Ah to 60 Ah. As the auxiliary battery 21, a lead storage battery or a lithium ion battery, which can easily secure a large storage capacity, may be preferable. On the other hand, the storage capacity of the redundant battery 41$r$ is, for example, 5 Ah to 10 Ah. As the redundant battery 41$r$, a lithium ion battery having a high energy density and easy to miniaturize may be preferable.

The electric power generator 22 is a device that generates electric power to be supplied to various devices. The auxiliary battery 21 and the electric power generator 22 provide an example of a normal power supply. The normal power supply is not limited to the one composed of both the auxiliary battery 21 and the electric power generator 22. The normal power supply may be provided by either the auxiliary battery 21 or the electric power generator 22. Alternatively, the normal power supply may be provided by using another power supply, in addition to the auxiliary battery 21 and the electric power generator 22. The redundant battery 41$r$ provides an example of a redundant power supply. However, the redundant power supply may be provided by a power generation device, in place of the battery such as the redundant battery 41$r$. Alternatively, the redundant power supply may be provided by using another power supply, in addition to the redundant battery 41$r$.

The mobile power supply system 1 includes a normal current path 11, a redundant current path 31$r$, a first current path 31$a$, and a second current path 32$a$. The auxiliary battery 21 and the electric power generator 22 are connected to the normal current path 11. A starter 23 and an air conditioner 24 are connected to the normal current path 11. The starter 23 is a device used for starting the prime mover, and is a load that temporarily consumes a large amount of electric power. The air conditioner 24 is a device used for controlling the temperature in a compartment of the vehicle and eliminating fogging of windows. The air conditioner 24 is a load including a servomotor, a blower that consumes electric power during an air conditioning operation, and the like. The starter 23 and the air conditioner 24 are loads that are always connected to the auxiliary battery 21 and the electric power generator 22, which provide the normal power supply. The starter 23 and the air conditioner 24 provide an example of a normal load. The normal load is a device having a small effect on the safety of the vehicle even if the operation thereof is stopped in the worst case when the power supply fails. The normal load is a load to which a power failure is allowed. The normal load is not limited to these two loads, that is, the starter 23 and the air conditioner 24. For example, a motor used for a power window can also be connected to the normal current path 11 as the normal load.

The normal current path 11 is provided with a normal current sensor 19. The normal current sensor 19 measures the magnitude of the current flowing through the normal current path 11. The normal current sensor 19 is provided at the intersection between the current path from the auxiliary battery 21 to the first current path 31$a$ and the current path from the auxiliary battery 21 to the second current path 32$a$. In other words, the normal current sensor 19 is provided at a position where the magnitude of the current flowing from the normal current path 11 including the auxiliary battery 21 toward the first current path 31$a$ and the second current path 32$a$ can be measured.

A redundant battery 41$r$ is connected to the redundant current path 31$r$. Further, there is no load always connected to the redundant current path 31$r$. Therefore, the redundant current path 31$r$ is a highly reliable current path in which an abnormality caused by a failure of the load or the like is less likely to occur, as compared with the normal current path 11 to which multiple electrical loads are always connected. A redundant current sensor 91 is connected to the redundant current path 31$r$. The redundant current sensor 91 measures the magnitude of the current flowing from the redundant battery 41$r$. The first current path 31$a$ is disposed between the normal current path 11 and the redundant current path 31$r$. The second current path 32$a$ is disposed in parallel with the first current path 31$a$, between the normal current path 11 and the redundant current path 31$r$.

A 1M switch 36$m$ is provided between the normal current path 11 and the first current path 31$a$. The 1M switch 36$m$ is a device that switches between an on state in which the normal current path 11 and the first current path 31$a$ are connected to each other and an off state in which the normal current path 11 and the first current path 31*a* are separated from each other. A 1R switch 36*r* is provided between the redundant current path 31*r* and the first current path 31*a*. The 1R switch 36*r* is a device that switches between an on state in which the redundant current path 31*r* and the first current path 31*a* are connected to each other and an off state in which the redundant current path 31*r* and the first current path 31*a* are separated from each other. The 1M switch 36*m* provides an example of a first normal switch. The 1R switch 36*r* provides an example of a first redundant switch.

A 2M switch 37*m* is provided between the normal current path 11 and the second current path 32*a*. The 2M switch 37*m* is a device that switches between an on state in which the normal current path 11 and the second current path 32*a* are connected to each other and an off state in which the normal current path 11 and the second current path 32*a* are separated from each other. A 2R switch 37*r* is provided between the redundant current path 31*r* and the second current path 32*a*. The 2R switch 37*r* is a device that switches between an on state in which the redundant current path 31*r* and the second current path 32*a* are connected to each other and an off state in which the redundant current path 31*r* and the second current path 32*a* are separated from each other. The 2M switch 37*m* provides an example of a second normal switch. The 2R switch 37*r* provides an example of a second redundant switch.

The 1M switch 36*m*, the 1R switch 36*r*, the 2M switch 37*m*, and the 2R switch 37*r* provide path switches 30 for switching the current paths. As the path switch 30, for example, a mechanical relay having contacts can be adopted. As the path switch 30, for example, a switch having no mechanical contact such as a semiconductor switch such as a MOSFET or an IGBT can be adopted. When a semiconductor switch is used as the path switch 30, it is easier to perform switching control at a higher speed than the mechanical relay.

When all the path switches 30 are in the on states, the normal current path 11, the redundant current path 31*r*, the first current path 31*a*, and the second current path 32*a* form a looped current path. When the 1M switch 36*m* and the 2M switch 37*m* are in the off states, the redundant battery 41*r* is separated from the starter 23 and the air conditioner 24. Further, when the 1M switch 36*m* and the 2M switch 37*m* are in the off states and the 1R switch 36*r* and the 2R switch 37*r* are in the on states, the redundant battery 41*r* does not supply the electric power to the starter 23 and the air conditioner 24, but supplies the electric power to the redundant load 40.

A first electric power steering device 41*a* and a first camera 41*b* are connected to the first current path 31*a*. Hereinafter, the first electric power steering device 41*a* may also be referred to as the first EPS 41*a*. The first EPS 41*a* is a load including a motor that assists a steering force. The first camera 41*b* is an image-capturing device for the purpose of monitoring the surroundings of the vehicle. However, a LIDAR may be used, in place of the first camera1 41*b*, to monitor the surroundings of the vehicle. The first EPS 41*a* and the first camera 41*b* are loads that require stable voltage supply. The stable voltage is a voltage within the guaranteed operating voltage range for enabling to continue the desired operation of the device. The first EPS 41*a* and the first camera 41*b* are loads that can receive electric power supply from both the auxiliary battery 21 and the redundant battery 41*r*. The first EPS 41*a* provides an example of the first redundant load. The first camera 41*b* provides an example of a first redundant load.

A second electric power steering device 42*a* and a second camera 42*b* are connected to the second current path 32*a*. Hereinafter, the second electric power steering device 42*a* may also be referred to as a second EPS 42*a*. The second EPS 42*a* is a load including a motor that assists a steering force. The second camera 42*b* is an image-capturing device for the purpose of monitoring the surroundings of the vehicle. However, a LIDAR may be used, in place of the second camera 42*b*, to monitor the surroundings of the vehicle. The second EPS 42*a* and the second camera 42*b* are loads that require stable voltage supply. The stable voltage is a voltage within the operation guaranteed voltage range for enabling to continue the desired operation of the device. The second EPS 42*a* and the second camera 42*b* are loads that can receive electric power supply from both the auxiliary battery 21 and the redundant battery 41*r*. The second EPS 42*a* provides an example of the second redundant load. The second camera 42*b* provides an example of a second redundant load.

The first EPS 41*a* and the second EPS 42*a* constitute a series of electric power steering device. The electric power steering device is a device that needs to continue to operate even when a part of the power supply is lost. Even if one of the first EPS 41*a* and the second EPS 42*a* fails, the function as the electric power steering device can be exhibited by using the other one. That is, not only the power supply path is redundant, but also the load constituting the electric power steering device is redundant. When only one of the first EPS 41*a* and the second EPS 42*a* as the loads functions properly, the steering performance is deteriorated as compared with the case where both the first EPS 41*a* and the second EPS 42*a* as the loads function properly. Therefore, in the normal state, the steering performance is maintained in a good state by using both the loads, that is, both the first EPS 41*a* and the second EPS 42*a*. The first EPS 41*a* and the second EPS 42*a* are loads that do not require electric power supply while the prime mover is not driven, but require electric power supply while the prime mover is driven and in a travelable state. The first EPS 41*a* and the second EPS 42*a* provide an example of a load for moving.

The first camera 41*b* and the second camera 42*b* form a series of surroundings monitoring device. The surroundings monitoring device is a device that needs to continue to operate even when a part of the electric power supply is lost. Even if one of the first camera 41*b* and the second camera 42*b* fails, the function as the surroundings monitoring device can be exhibited by using the other one. That is, not only the power supply path is redundant, but also the load constituting the surroundings monitoring device is redundant. When only one of the load of the first camera 41*b* and the second camera 42*b* as the loads functions properly, the surroundings monitoring performance is deteriorated, as compared with the case where both the loads, that is, both the first camera 41*b* and the second camera 42*b* function properly. Therefore, in the normal state, the surroundings monitoring performance is maintained in a good state by using both the first camera 41*b* and the second camera 42*b*. The surroundings monitoring function may be redundantly configured by using different devices, such as using the imaging device as the first camera 41*b* and the LIDAR as the second camera 42*b*. The first camera 41*b* and the second camera 42*b* are loads that require electric power supply regardless of the drive of the prime mover. The first camera 41*b* and the second camera 42*b* provide an example of a regular load.

The first EPS 41*a*, the second EPS 42*a*, the first camera 41*b*, and the second camera 42*b* form a redundant load 40. In other words, the redundant load 40 includes a first redundant load and a second redundant load. The first redundant load includes the first EPS 41*a* and the first camera 41*b*, and the second redundant load includes the second EPS 42*a* and the second camera 42*b*. The redundant load 40 may include a load other than the first EPS 41*a*, the second EPS 42*a*, the first camera 41*b*, and the second camera 42*b*. The redundant load 40 may be provided by another load that needs to increase redundancy in place of the first EPS 41*a*, the second EPS 42*a*, the first camera 41*b*, and the second camera 42*b*.

The mobile power supply system 1 includes a key switch 5, a power supply transition control unit 55, a first power distribution device 51, and a second power distribution device 52. The key switch 5 is a switch for switching the driving state of the vehicle by an operation of an occupant. The key switch 5 is a switch for switching the driving state between a plurality of states, such as an off state, an accessory (ACC) state, and an ignition (IG) state. As the key switch 5, a push button that switches the state when pressed by an occupant can be adopted.

The power supply transition control unit 55 acquires power supply transition information, such as the number of times the key switch 5 has been pressed and whether the brake is depressed when the key switch 5 is pressed. The power supply transition control unit 55 outputs a transition signal indicating a present driving state of the vehicle, such as the off state, the accessory state, or the ignition state.

The first power distribution device 51 and the second power distribution device 52 are devices that switch the current paths depending on the present driving state of the mobile object among the off state, the accessory state, and the ignition state. The first power distribution device 51 is connected to the first current path 31*a*. The second power distribution device 52 is connected to the second current path 32*a*. The first power distribution device 51 provides an example of a power distribution unit. The second power distribution device 52 provides an example of the power distribution unit.

The mobile power supply system 1 includes a signal line 60, a first ignition path 61*a*, a first accessory path 61*b*, a second ignition path 62*a*, and a second accessory path 62*b*. The signal line 60 connects the key switch 5, the power supply transition control unit 55, the first power distribution device 51, and the second power distribution device 52. The signal line 60 provides a path for exchanging transition signals. The signal line 60 constitutes a part of an in-vehicle network, such as CAN (registered trademark). The first ignition path 61*a* connects the first power distribution device 51 and the first EPS 41*a*. The first accessory path 61*b* connects the first power distribution device 51 and the first camera 41*b*. The second ignition path 62*a* connects the second power distribution device 52 and the second EPS 42*a*. The second accessory path 62*b* connects the second power distribution device 52 and the second camera 42*b*.

A part of the first EPS 41*a* and a part of the second EPS 42*a* are supplied with a starting voltage (+B) of electric power, regardless of the off state, the accessory state, and the ignition state of the vehicle. However, in a state where only the part of the first EPS 41*a* and only the part of the second EPS 42*a* are supplied with the electric power, the function as the electric power steering device cannot be exhibited. Further, in the ignition state of the vehicle, the electric power is supplied to the entire first EPS 41*a* and the entire second EPS 42*a*. As a result, the first EPS 41*a* and the second EPS 42*a* are in a state where the first EPS 41*a* and the second EPS 42*a* can exhibit the function as the electric power steering device. A part of the first camera 41*b* and a part of the second camera 42*b* are supplied with electric power, regardless of the off state, the accessory state, and the ignition state of the vehicle. However, in a state where only the part of the first camera 41*b* and only the part of the second camera 42*b* are supplied with the electric power, the surroundings monitoring function cannot be exhibited. Further, in the accessory state and the ignition state of the vehicle, the electric power is supplied to the entire first camera 41*b* and the entire second camera 42*b*. As a result, the first camera 41*b* and the second camera 42*b* are in a state where the first camera 41*b* and the second camera 41*b* can exhibit the surroundings monitoring function.

Figure 2:
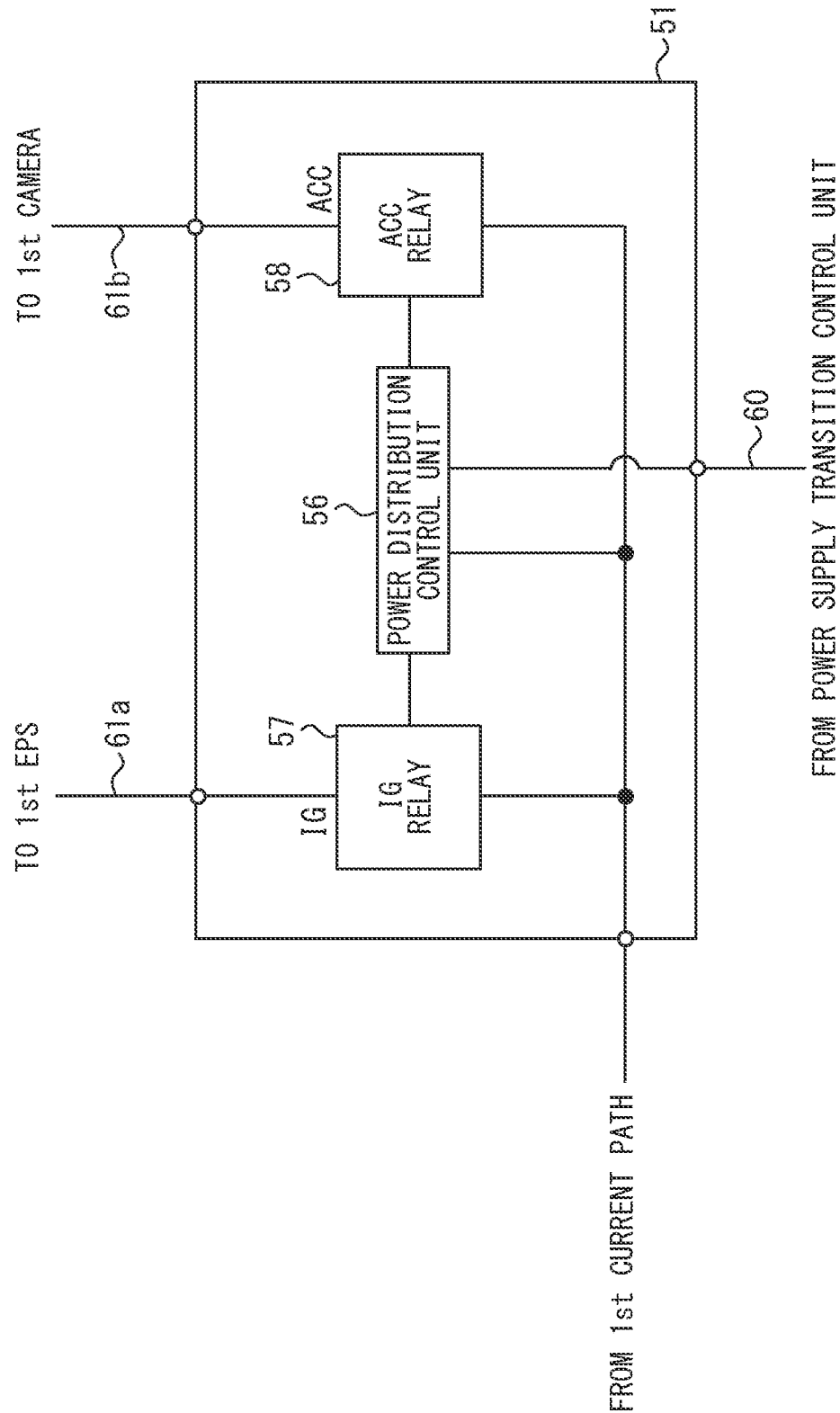
FIG. 2 is a diagram showing a schematic configuration of a first power distribution device.

As shown in FIG. 2, the first power distribution device 51 includes a power distribution control unit 56, an ignition relay 57, and an accessory relay 58. The power distribution control unit 56 receives the transition signal output from the key switch 5 via the power supply transition control unit 55. The power distribution control unit 56 outputs an on/off signal to the ignition relay 57 and the accessory relay 58 for switching on and off the ignition relay 57 and the accessory relay 58.

The ignition relay 57 are switched between an on state and an off state based on the on/off signal output from the power distribution control unit 56. When the ignition relay 57 is in the off state, no current can flow from the first current path 31*a* to the first EPS 41*a* via the ignition relay 57. When the ignition relay 57 is in the on state, a current can flow from the first current path 31*a* to the first EPS 41*a* via the ignition relay 57.

The accessory relay 58 is switched between an on state and an off state based on the on/off signal output from the power distribution control unit 56. When the accessory relay 58 is in the off state, no current can flow from the first current path 31*a* to the first camera 41*b* via the accessory relay 58. When the accessory relay 58 is in the on state, a current can flow from the first current path 31*a* to the first camera 41*b* via the accessory relay 58.

Upon receiving the transition signal indicating the off state of the vehicle, the power distribution control unit 56 turns off both the ignition relay 57 and the accessory relay 58. In other words, the power distribution control unit 56 controls to turn off the ignition relay 57 and the accessory relay 58 so that no current flows to the first EPS 41*a* and the first camera 41*b* through the first power distribution device 51, and both the first EPS 41*a* and the first camera 41*b* are not driven.

Upon receiving the transition signal indicating the accessory state of the vehicle, the power distribution control unit 56 turns off the ignition relay 57 and turns on the accessory relay 58. In other words, the power distribution control unit 56 controls the ignition relay 57 and the accessory relay 58 so that no current flows to the first EPS 41*a* through the first power distribution device 51 and the current flows only to the first camera 41*b*. In this accessory state, the first EPS 41*a* is not driven, and only the first camera 41*b* is driven.

Upon receiving the transition signal indicating the ignition state of the vehicle, the power distribution control unit 56 turns on both the ignition relay 57 and the accessory relay 58. In other words, the power distribution control unit 56 controls the ignition relay 57 and the accessory relay 58 so that a current flows to both the first EPS 41*a* and the first camera 41*b* through the first power distribution device 51. In this ignition state, both the first EPS 41*a* and the first camera 41*b* are driven.

Figure 3:
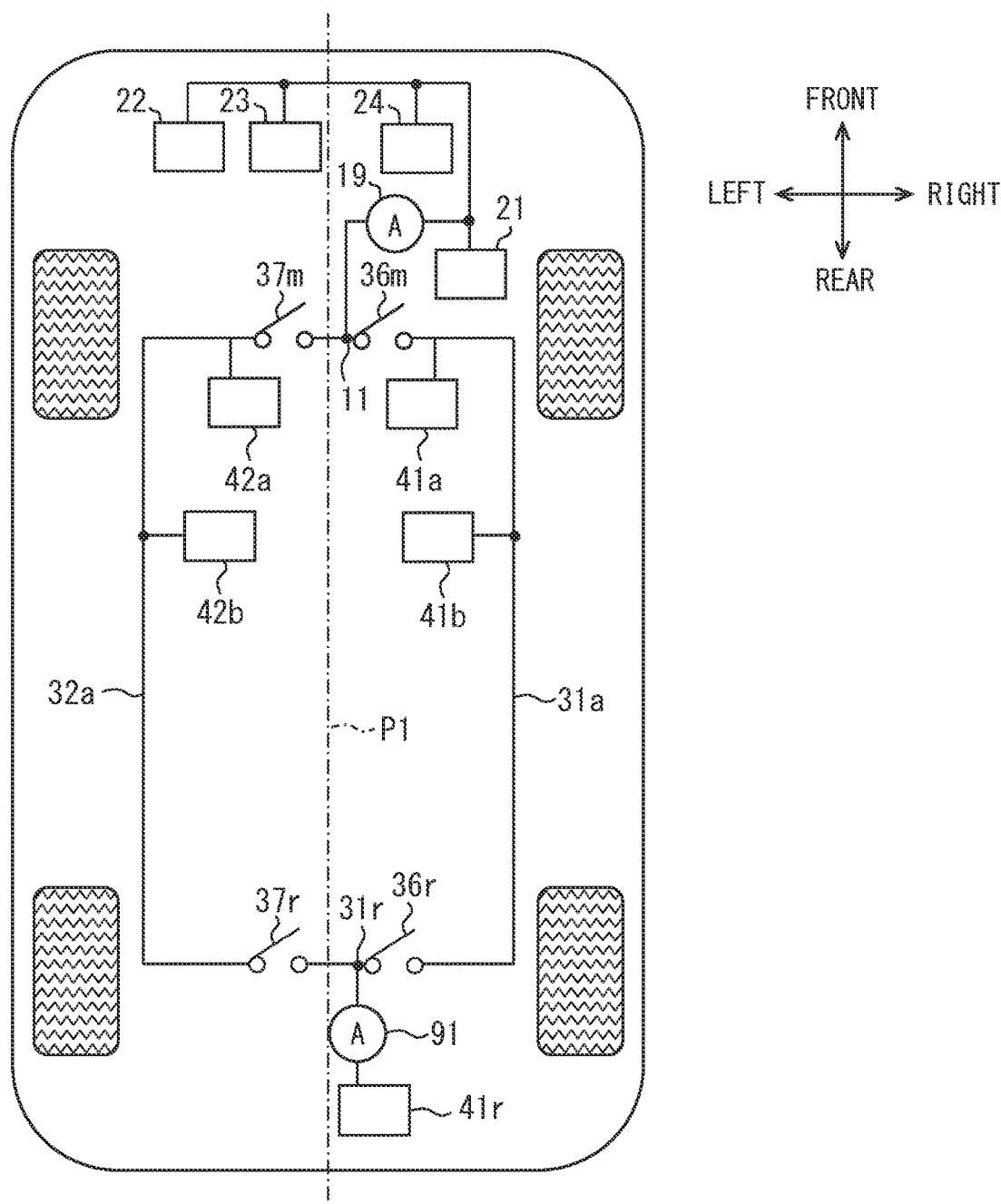
FIG. 3 is a diagram showing the power supply system in a state of being mounted on a vehicle as the mobile object.

FIG. 3 shows the mobile power supply system 1 in the state of being mounted on the vehicle. The auxiliary battery 21, the electric power generator 22, the starter 23, and the air conditioner 24 are provided at a front part of the vehicle. On the other hand, the redundant battery 41r is provided at a rear part of the vehicle. In other words, the auxiliary battery 21 and the redundant battery 41r are provided so as to be separated from each other in a front-rear direction of the vehicle. Therefore, when an impact is applied to the front of the vehicle from the outside, the redundant battery 41r can easily function as a power supply in normal. On the other hand, when an impact is applied to the rear of the vehicle from the outside, the auxiliary battery 21 can easily function as a power supply in normal. In other words, the auxiliary battery 21 and the redundant battery 41r have a positional relationship so that both the auxiliary battery 21 and the redundant battery 41r are less likely to fail at the same time even when the vehicle receives an impact at a part.

The first current path 31a and the second current path 32a are provided to extend from the front to the rear of the vehicle but apart from each other in left and right areas with respect to the central portion of the vehicle. In FIG. 3, a line P1 is a virtual line that passes through the central portion of the vehicle and extends along the front-rear direction of the vehicle. The first current path 31a is provided on the right side of the virtual line P1. The second current path 32a is provided on the left side of the virtual line P1. The first current path 31a and the second current path 32a are arranged symmetrically with respect to each other with the virtual line P1 as the axis. In other words, the path length of the first current path 31a and the path length of the second current path 32a are equal to each other. In addition, the position where the first current path 31a is bent and the direction in which the first current path 31a is bent correspond to the position where the second current path 32a is bent and the direction in which the second current path 32a is bent. The first current path 31a and the second current path 32a may have a symmetrical relationship with each other at positions biased to the left or right of the vehicle. The first current path 31a and the second current path 32a may not be strictly symmetrical with respect to the virtual line P1.

The path length of the first current path 31a and the path length of the second current path 32a are substantially equal to each other. In this case, the path length of the first current path 31a is the length from the 1M switch 36m to the 1R switch 36r on the first current path 31a. The path length of the second current path 32a is the length from the 2M switch 37m to the 2R switch 37r on the second current path 32a. The difference in length between the path length of the first current path 31a and the path length of the second current path 32a is 50% or less of the average value of the path length of the first current path 31a and the path length of the second current path 32a.

The first current path 31a and the second current path 32a are power supply lines made of substantially the same material and having substantially the same thickness. Therefore, the first current path 31a and the second current path 32a, which are substantially symmetrical and have substantially the same path length, have substantially the same inductance values. The inductance of the first current path 31a is provided by the inductance of the first current path 31a from the 1M switch 36m to the 1R switch 36r. The inductance of the second current path 32a is provided by the inductance of the second current path 32a from the 2M switch 37m to the 2R switch 37r. Also for the normal current path 11 and the redundant current path 31r, the material and thickness of the power supply lines are substantially the same as those of the first current path 31a and the second current path 32a. However, the material and thickness of the power supply lines may be changed depending on the location to form the current path.

The path length of the portion of the normal current path 11 from the 1M switch 36m to the 2M switch 37m is shorter than the path length of the first current path 31a and the path length of the second current path 32a. In other words, the inductance of the first current path 31a is a value closer to the inductance of the second current path 32a than the inductance of the portion of the normal current path 11 from the 1M switch 36m to the 2M switch 37m. Similarly, the path length of the portion of the redundant current path 31r from the 1R switch 36r to the 2R switch 37r is shorter than the path length of the first current path 31a and the path length of the second current path 32a. In other words, the inductance of the first current path 31a is a value closer to the inductance of the second current path 32a than the inductance of the portion of the redundant current path 31r from the 1R switch 36r to the 2R switch 37r.

Figure 4:
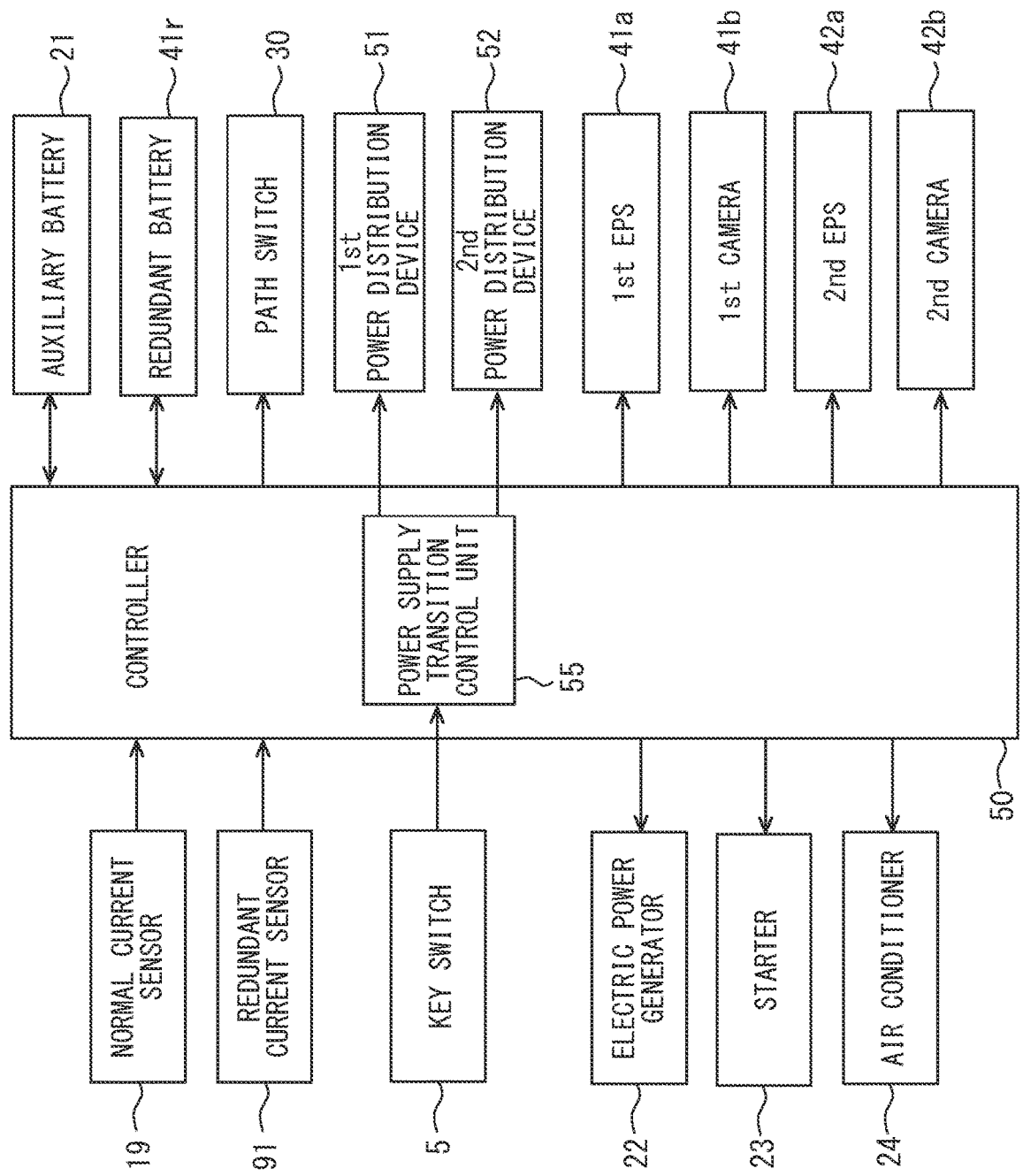
FIG. 4 is a block diagram related to control of the power supply system.

FIG. 4 is a block diagram showing a control system. A control device in this specification may also be referred to as an electronic control unit (ECU). The control device is provided by (a) an algorithm as multiple logic called if-then-else form, or (b) a learned model tuned by machine learning, for example, an algorithm as a neural network.

The control device is provided by a control system including at least one computer. The control system may include multiple computers linked by a data communication device. The computer includes at least one hardware processor that is a processor of hardware. The hardware processor may be provided by (i), (ii), or (iii) below.

(i) The hardware processor may be at least one processor core that executes a program stored in at least one memory. In this case, the computer is provided with at least one memory and at least one processor core. The processor core is called a central processing unit (CPU), a graphics processing unit (GPU), a RISC-CPU, or the like. The memory is also referred to as a storage medium. The memory is a non-transitory and tangible storage medium that non-transitorily stores "program and/or data" readable by the processor. The storage medium may be a semiconductor memory, a magnetic disk, an optical disk, or the like. The program may be distributed as a single unit or as a storage medium in which a program is stored.

(ii) The hardware processor may be a hardware logic circuit. In this case, the computer is provided with a digital circuit including a number of programmed logic units (gate circuits). The digital circuit is also referred to as a logic circuit array, for example, an application-specific integrated circuit (ASIC), a field programmable gate array (FPGA), a programmable gate array (PGA), a complex programmable logic device (CPLD), or the like. The digital circuit may include a memory that stores programs and/or data. The computer may be provided by an analog circuit. The computer may be provided with a combination of digital circuit and analog circuit.

(iii) The hardware processor may be a combination of (i) and (ii) described above. (i) and (ii) are disposed on different chips or on a common chip. In these cases, the portion (ii) is also referred to as accelerator.

The control device, the signal source, and the control target object provide a variety of elements. At least some of these elements may be referred to as a block, a module, or a section. The element included in the control system is referred to as functional means only in an intentional case.

The control device and a method thereof described in this disclosure may be realized by a dedicated computer provided by configuring a processor and a memory programmed to execute one or multiple functions embodied by a computer program. Alternatively, the control device and the method thereof described in this disclosure may be realized by a dedicated computer provided by configuring a processor with one or more dedicated hardware logic circuits. Alternatively, the control device and the method thereof described in this disclosure may be realized by one or more dedicated computers configured by a combination of a processor and a memory programmed to execute one or multiple functions, and a processor configured by one or more hardware logic circuits. The computer program may also be stored on a computer-readable non-transitory tangible recording medium as instructions to be executed by a computer.

As shown in FIG. 4, the controller 50 includes the power supply transition control unit 55. The power supply transition control unit 55 is connected to the key switch 5. The power supply transition control unit 55 acquires information indicating an operation of the key switch 5 by an occupant. More specifically, the power supply transition control unit 55 acquires information indicative of the state of the key switch 5, whether the key switch 5 is in the off state, the accessory state, or the ignition state. The controller 50 is connected to the normal current sensor 19 and the redundant current sensor 91. The controller 50 acquires current values measured by using the normal current sensor 19 and the redundant current sensor 91. Further, the controller 50 acquires information necessary for the air conditioning operation by using an air conditioner sensor. Further, the controller 50 detects an operation of the steering wheel and acquires the information necessary for steering the vehicle.

The controller 50 is connected to the electric power generator 22, the starter 23, and the air conditioner 24. The controller 50 controls the electric power generator 22 to generate the required electric power. The controller 50 controls the starter 23 to appropriately start an internal combustion engine and an electric motor. The controller 50 controls the air conditioner 24 to maintain the interior of the vehicle in a comfortable air-conditioned state. The controller 50 is connected to a normal load in addition to the two loads of the starter 23 and the air conditioner 24, and controls the drive of the normal load.

The controller 50 is connected to the auxiliary battery 21 and the redundant battery 41r. The controller 50 acquires information on the amount of electricity stored from the auxiliary battery 21 and the redundant battery 41r, and controls so as to maintain the amount of electricity stored in each of the auxiliary battery 21 and the redundant battery 41r within an appropriate range. That is, for example, when the amount of electricity stored in the auxiliary battery 21 and the redundant battery 41r is small, the controller 50 controls the electric power generator 22 to generate electricity and to charge the auxiliary battery 21 and the redundant battery 41r.

The controller 50 is connected to the path switch 30. That is, the controller 50 is connected to the 1M switch 36m, the 1R switch 36r, the 2M switch 37m, and the 2R switch 37r. The controller 50 controls the path switch 30 to turn on or off based on the current values of the normal current sensor 19 and the redundant current sensor 91. The details of the control of the path switch 30 by the controller 50 will be described in detail later.

The controller 50 is connected to the first EPS 41a and the first camera 41b. The controller 50 drives the first EPS 41a so as to exert the function as the power steering device. The controller 50 drives the first camera 41b so as to exert the function as the surroundings monitoring device. The power supply transition control unit 55 is connected to the first power distribution device 51. The power supply transition control unit 55 drives the first power distribution device 51 to control the timing of supplying the driving power to the first EPS 41a and the first camera 41b. In other words, the power supply transition control unit 55 drives the first power distribution device 51 to control the power supply transition related to the first EPS 41a and the first camera 41b. By supplying electric power to the redundant load 40 via the first power distribution device 51, it is possible to link the operation sequence of each load with the key switch 5. As a result, it is possible to use each load, which has been conventionally used, without largely changing the design and manufacturing process.

The controller 50 is connected to the second EPS 42a and the second camera 42b. The controller 50 drives the second EPS 42a so as to exert the function as the power steering device. The controller 50 drives the second camera 42b so as to exert the function as the surroundings monitoring device. The power supply transition control unit 55 is connected to the second power distribution device 52. The power supply transition control unit 55 drives the second power distribution device 52 to control the timing of supplying the driving power to the second EPS 42a and the second camera 42b. In other words, the power supply transition control unit 55 drives the second power distribution device 52 to control the power supply transition related to the second EPS 42a and the second camera 42b. By supplying electric power to the redundant load 40 via the second power distribution device 52, it is possible to link the operation sequence of each load with the key switch 5. As a result, it is possible to use each load, which has been conventionally used, without largely changing the design and manufacturing process.

An example of controlling the path switches 30 between the on state and the off state by the controller 50 will be described below. In a state before an abnormality detection for detecting the presence or absence of an abnormality such as a ground fault is performed, all the route switches 30 are in the on states. That is, both the auxiliary battery 21 and the redundant battery 41r as the power supplies are in the states of supplying the electric power to the redundant load 40. In this state, if a ground fault occurs at any position of the mobile power supply system 1, a large amount of current will flow from both the auxiliary battery 21 and the redundant battery 41r as the power supplies toward the position of the ground fault. Therefore, in a case where a large amount of current is unintentionally flowing through the mobile power supply system 1 due to a defect such as a ground fault, it is necessary to promptly suppress the continuous flow of the large amount of current.

Figure 5:
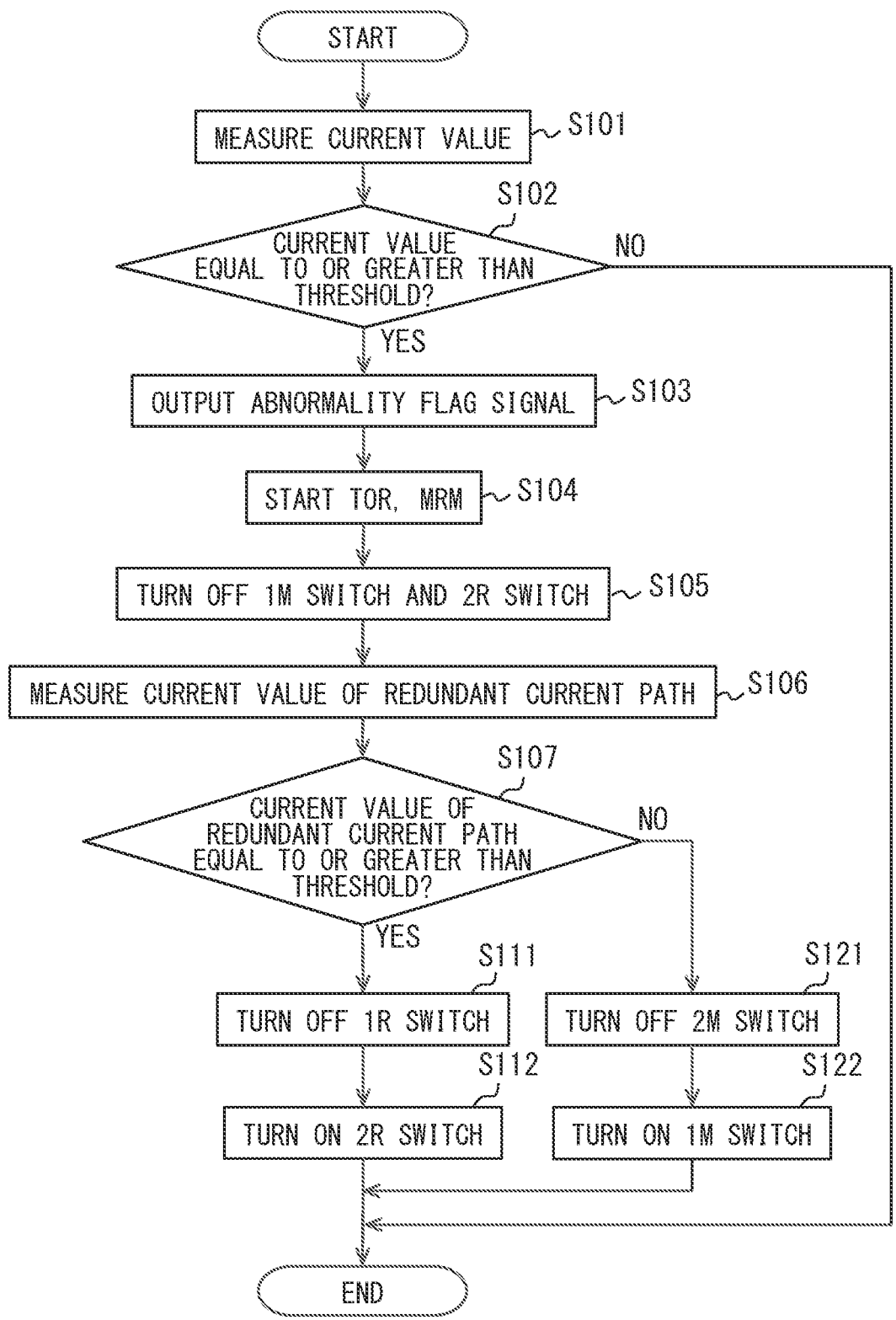
FIG. 5 is a flow chart related to the control of the power supply system.

In FIG. 5, when an abnormality detection for detecting an abnormality such as a ground fault is started, the magnitude of the current is measured in S101. In this case, the magnitude of the current is measured using both the normal current sensor 19 and the redundant current sensor 91. After measuring the currents, the process proceeds to S102.

In S102, it is determined whether or not the measured current values are equal to or greater than a predetermined value. If either the current value measured by the normal current sensor 19 or the current value measured by the redundant current sensor 91 is equal to or greater than the predetermined value, it is determined that a defect such as a ground fault has occurred in the mobile power supply system 1. Thus, the process proceeds to S103. Here, an abnormality such as a ground fault may occur in various parts such as each load, power supply, and current path, constituting the mobile power supply system 1. On the other hand, when both the current value measured by the normal current sensor 19 and the current value measured by the redundant current sensor 91 are less than the predetermined value, it is determined that the mobile power supply system 1 is operating properly. As a result, the control related to the abnormality detection is ended.

In S103, the controller 50 outputs an abnormality flag signal. In other words, the controller 50 transmits, as an abnormality flag, a signal indicative of that an abnormality has occurred at any part of the mobile power supply system 1 to an operation control unit that controls operations, such as an automatic driving operation or an operation assistance. After the abnormality flag signal is output, the process proceeds to S104.

In S104, the controller 50 starts a takeover request (TOR). The TOR is an operation to issue a request to give the driving responsibility to the driver for the purpose of stopping the automatic driving operation in the event of an abnormality. When the driver responds to the request of the TOR, the automatic driving operation is switched to a manual operation. When the driver does not respond to the request of the TOR, the controller 50 starts a minimum risk maneuver (MRM) while maintaining the automatic driving operation. The MRM is a driving control that stops the vehicle in a traveling lane or drives the vehicle toward a road shoulder and stops the vehicle by the automatic driving operation. After starting the MRM, the process proceeds to S105. In S104, when the manual operation is performed from the beginning, the process proceeds to S105 without starting the TOR or MRM.

In S105, the 1M switch 36*m* and the 2R switch 37*r* are turned off. At this time, the 2M switch 37*m* and the 1R switch 36*r* are kept in the on states. As a result, the normal current path 11 is separated from the first current path 31*a* and is in a state of being electrically conducted only with the second current path 32*a*. On the other hand, the redundant current path 31*r* is separated from the second current path 32*a* and is in a state of being electrically conducted only with the first current path 31*a*. That is, the mobile power supply system 1 is in a state of being separated into two power systems, one being a main system including the auxiliary battery 21 and the other being a redundant system including the redundant battery 41*r*. After separating the power system into two power systems, the process proceeds to S106.

In S106, the magnitude of the current flowing through the redundant current path 31*r* is measured. In this case, the redundant current path 31*r* is separated from the second current path 32*a* and is in a state of being electrically conducted only with the first current path 31*a*. Therefore, the redundant current sensor 91 measures the magnitude of the current flowing from the redundant current path 31*r* toward the first current path 31*a*. After measuring the current, the process proceeds to S107.

In S107, it is determined whether or not the magnitude of the current measured by the redundant current sensor 91 is equal to or greater than a predetermined value. If the magnitude of the current measured by the redundant current sensor 91 is equal to or greater than the predetermined value, it is determined that an abnormality has occurred in the redundant system that is in the electrical conduction with the redundant battery 41*r*, and the process proceeds to S111. On the other hand, when the magnitude of the current measured by the redundant current sensor 91 is less than the predetermined value, it is determined that an abnormality has occurred in the main system that is in the electrical conduction with the auxiliary battery 21, and the process proceeds to S121.

In S111, the 1R switch 36*r* is turned off. As a result, the first current path 31*a* and the redundant current path 31*r* are separated from each other, and the first current path 31*a* is separated from the other current paths. In this case, since the first current path 31*a* in which an abnormality such as a ground fault has occurred is separated from other current paths, it is possible to suppress the voltage required for driving each electrical load from becoming unsustainable due to a large amount of current flowing from the auxiliary battery 21 or the redundant battery 41*r* toward the position of the ground fault. After separating the first current path 31*a* from the other current paths, the process proceeds to S112.

In S112, the 2R switch 37*r* is turned on. As a result, the second current path 32*a* and the redundant current path 31*r* are connected to each other, and the second current path 32*a* is thus in the state of being connected to the two current paths, that is, the normal current path 11 and the redundant current path 31*r*. Therefore, it is possible to stably supply electric power to the second EPS 42*a* and the second camera 42*b* connected to the second current path 32*a* by using two power supplies, that is, the auxiliary battery 21 and the redundant battery 41*r*. The abnormality detection is ended while keeping the state in which the first current path 31*a* is separated and the second current path 32*a* is connected to the normal current path 11 and the redundant current path 31*r*.

In S121, the 2M switch 37*m* is turned off. As a result, the second current path 32*a* and the normal current path 11 are separated from each other, and the second current path 32*a* is separated from the other current paths. In this case, since the second current path 32*a* in which an abnormality such as a ground fault has occurred is separated from the other current paths, it is possible to suppress the voltage required for driving each electrical load from becoming unsustainable due to a large amount of current flowing from the auxiliary battery 21 or the redundant battery 41*r* toward the location of the ground fault. After separating the second current path 32*a* from the other current paths, the process proceeds to S122.

In S122, the 1M switch 36*m* is turned on. As a result, the first current path 31*a* and the normal current path 11 are connected to each other, and the first current path 31*a* is thus in the state of being connected to the two current paths, that is, the normal current path 11 and the redundant current path 31*r*. Therefore, it is possible to stably supply electric power to the first EPS 41*a* and the first camera 41*b* connected to the first current path 31*a* by using the two power supplies, that is, the auxiliary battery 21 and the redundant battery 41*r*. The abnormality detection is ended while keeping the state in which the second current path 32*a* is separated, and the first current path 31*a* is connected to the normal current path 11 and the redundant current path 31*r*.

The abnormality detection in the mobile power supply system 1 is, for example, periodically and repeatedly executed at predetermined time intervals. As a result, even if an abnormality such as a ground fault occurs while the vehicle is running, the position of the ground fault can be separated from the power supply such as the auxiliary battery 21 or the redundant battery 41*r*.

In the abnormality detection, the presence or absence of an abnormality may be detected by using a physical quantity other than the current, such as voltage and temperature, in place of measuring the current. For example, in the case of measuring the temperature, it is possible to determine an occurrence of an abnormality when an abnormal heat generation is detected. Further, the presence or absence of an abnormality may be detected based on the combination of an electric current and a physical quantity other than the electric current.

In S101, the magnitude of the current may be measured by either the normal current sensor 19 or the redundant current sensor 91, in place of measuring the magnitude of the current using both the normal current sensor 19 and the redundant current sensor 91. In such a case, the number of current sensors provided in the mobile power supply system 1 can be reduced.

In S105, the 1R switch 36r and the 2M switch 37m may be turned off, in place of turning off the 1M switch 36m and the 2R switch 37r. In such a case, the normal current path 11 is separated from the second current path 32a and is in a state of being electrically conducted only with the first current path 31a. On the other hand, the redundant current path 31r is separated from the first current path 31a and is in a state of being electrically conducted only with the second current path 32a. That is, the mobile power supply system 1 is in the state of being separated into two power systems, a main system and a redundant system.

In S105, the air conditioner 24, which is a normal load, may be forcibly stopped to temporarily reduce the power consumed by the normal load. In such a case, the electric power stored in the auxiliary battery 21 can be used more for driving the redundant load 40. Therefore, it is less likely that the redundant load 40 will not be supplied with electric power. In this case, it is preferable to release the stopped state of the normal load at the timing when the abnormality detection control is ended and the power supply to the redundant load 40 becomes stable.

In S106, the current flowing through the normal current path 11 may be measured, in place of measuring the magnitude of the current flowing through the redundant current path 31r. In other words, the current value may be measured with the normal current sensor 19, in place of measuring with the redundant current sensor 91. In such a case, it is possible to determine whether or not an abnormality such as a ground fault has occurred in a current path that is electrically conducted with the normal current path 11. In other words, it is possible to determine whether an abnormality has occurred in the main system or the redundant system.

S112 may be omitted. In such a case, in a state where the first current path 31a having the ground fault is separated from the other current paths, the auxiliary battery 21 can supply electric power to the normal load, the first EPS 41a, and the first camera 41b. At this time, since the redundant battery 41r is separated from the auxiliary battery 21 and the electric power generator 22, the electric power output from the auxiliary battery 21 and the electric power generator 22 is not used for charging the redundant battery 41r. Therefore, a stable voltage can be supplied to the first EPS 41a and the first camera 41b without being affected by the redundant battery 41r. Similarly, S122 may be omitted.

According to the embodiment described above, the auxiliary battery 21 forming a part of the normal power supply are connected to the starter 23 and the air conditioner 24, and can be connected to at least one of the first redundant load and the second redundant load. Therefore, the auxiliary battery 21 that supplies electric power to the normal load including the starter 23 and the air conditioner 24 can be used to supply electric power to the redundant load 40. In other words, the auxiliary battery 21 can supply power not only to the normal load but also to the redundant load 40. Therefore, as compared with the case where the auxiliary battery 21 is not used as the power supply for increasing the redundancy, the power can be supplied to the redundant load 40 from many power supplies. As such, in the mobile power supply system 1, the redundancy can be enhanced with a simple configuration by effectively using the auxiliary battery 21. Similarly to the auxiliary battery 21, the electric power generator 22 that forms a part of the normal power supply can supply electric power not only to the normal load but also to the redundant load 40. Therefore, the redundancy of the mobile power supply system 1 can be enhanced with a simple configuration by effectively using the electric power generator 22.

The normal current path 11, the redundant current path 31r, the first current path 31a, and the second current path 32a are connected in the form of loop via the path switches 30. Therefore, even if a part of the looped current path is disconnected, the conduction state in which the normal current path 11, the redundant current path 31r, the first current path 31a, and the second current path 32a are connected can be maintained. Therefore, the electric power can be stably supplied to the redundant load 40.

The inductance of the first current path 31a is a value closer to the inductance of the second current path 32a than the inductance of the portion of the normal current path 11 from the 1M switch 36m to the 2M switch 37m. In other words, the inductance of the first current path 31a is substantially equal to that of the second current path 32a. Therefore, the electromotive voltage induced when the transient current flows in the first current path 31a and the second current path 32a becomes substantially equal between the first current path 31a and the second current path 32a. In this case, it is possible to suppress the flow of unnecessary circulating current through the looped current path. As such, the loss due to the transient current can be reduced.

The first current path 31a and the second current path 32a are arranged symmetrically with respect to the virtual line P1. Therefore, the lengths and bending states of the first current path 31a and the second current path 32a are substantially the same. Therefore, it is easy to make the inductance of the first current path 31a and the inductance of the second current path 32a substantially equal.

The auxiliary battery 21 and the electric power generator 22 are always connected to the starter 23 and the air conditioner 24. In addition, the redundant battery 41r can be connected to at least one of the first redundant load and the second redundant load in a state of being separated from the starter 23 and the air conditioner 24. Therefore, the starter 23 and the air conditioner 24 can be stably driven by constantly receiving the electric power from the auxiliary battery 21. For example, in a case where an abnormality such as a ground fault has occurred in the starter 23, the electric power can be supplied to the redundant load 40 in a state where the redundant battery 41r is separated from the starter 23. Therefore, the redundant battery 41r can supply electric power to the redundant load 40 without being affected by the ground fault generated in the normal current path 11. As such, the evacuation running can be performed by using the electric power stored in the redundant battery 41r.

The normal power supply is the auxiliary battery 21 that is capable of storing the electric power to be supplied to the normal load, and the redundant power supply is the redundant battery 41r having a smaller storage capacity than the auxiliary battery 21. In this case, the redundant battery 41r can be made smaller and lighter, as compared with the case in which the auxiliary battery 21 and the redundant battery 41r have the same storage capacity. Therefore, it is easy to design the entire power supply system 1 for a mobile object in a small size and light weight. The resistance of the mobile object received from a fluid, such as air, increases with an increase in volume of the mobile object. Therefore, it is very important to reduce the size of the entire mobile object. Further, the mobile object needs more energy for moving with an increase in weight of the mobile object. Therefore, it is very important to reduce the weight of the entire mobile object.

The normal power supply includes the electric power generator 22 that is provided to be always connected to the auxiliary battery 21, and can generate the electric power to be supplied to the normal load. In this case, by adjusting the amount of electric power generated by the electric power generator 22, it is possible to suppress the shortage of the electric power to be supplied to the normal load and the redundant load 40. Therefore, the normal load and the redundant load 40 can be driven stably. Further, the electric power generator 22 is always connected to the auxiliary battery 21 that has a storage capacity larger than that of the redundant battery 41r. Therefore, as compared with the case where the electric power generator 22 is always connected to the redundant battery 41r, a large amount of electric power can be easily stored regardless of the connection state of the path switches 30.

When an occurrence of abnormality in the first redundant load is detected, the controller 50 turns off the 1M switch 36m and the 1R switch 36r and turns on the 2M switch 37m and the 2R switch 37r. Therefore, the first current path 31a can be separated from the auxiliary battery 21 and the redundant battery 41r. As such, the electric power stored in the auxiliary battery 21 and the redundant battery 41r can be stably supplied to the second EPS 42a and the second camera 42b, which are operating in normal. In particular, in a vehicle that performs an autonomous driving operation, an electric steering function and a surroundings monitoring function are very important functions. Therefore, it is very useful to apply the mobile power supply system 1 in which the loads for the electric steering function and the surroundings monitoring function are redundantly configured to the autonomous driving vehicle.

When an abnormality is detected in any of the redundant loads 40 in the abnormality detection control, the controller 50 separates the auxiliary battery 21 and the redundant battery 41r from each other. In other words, in the abnormality detection control, when the current value is equal to or higher than a predetermined value, the controller 50 controls the path switches 30 so as to temporarily separate the mobile power supply system 1 into two systems. Therefore, it is less likely that both of the auxiliary battery 21 and the redundant battery 41r will continue to supply the electric power to the one abnormal portion. In other words, either the auxiliary battery 21 or the redundant battery 41r can continue to supply the electric power to the redundant load 40 in which the abnormality has not occurred without being affected by the abnormal position. As such, the power supply can be continued for the redundant load 40 which is in normal.

In the abnormality detection control, the controller 50 controls the path switches 30 so as to connect each of the redundant load 40 in which the abnormality has occurred and the redundant load 40 in which the abnormality has not occurred to either the auxiliary battery 21 or the redundant battery 41r, respectively. Therefore, in the abnormality detection control, it is possible to stably continue the power supply to the redundant load 40 in which no abnormality has occurred. As such, the functions such as the electric power steering function and the surroundings monitoring function can be continued by using the redundant load 40 in which no abnormality has occurred.

The mobile power supply system 1 has the first power distribution device 51 that supplies the electric power to the first camera 41b without supplying the electric power to the first EPS 41a in the accessory state, and supplies the electric power to both the first EPS 41a and the first camera 41b in the ignition state. Therefore, the first power distribution device 51 can supply electric power to each of the first EPS 41a and the first camera 41b at an appropriate timing.

The first power distribution device 51 includes the power distribution control unit 56 that selectively controls the on state and the off state of the ignition relay 57 and the accessory relay 58 according to the received transition signal. Therefore, by sending the transition signal to the first power distribution device 51, the timing of the power transition to the first EPS 41a and the first camera 41b can be appropriately controlled. As such, it is possible to link the operation sequence of the first EPS 41a and the first camera 41b to the key switch 5 without significantly changing the conventional configuration.

The redundant load 40 includes the first redundant load and the second redundant load. Therefore, even if the first EPS 41a forming a part of the first redundant load fails, the function as the electric power steering device can be exhibited by using the second EPS 42a. Further, even when the power supply to the first camera 41b is stopped, the surroundings monitoring function can be continued by keeping the power supply to the second camera 42b. Therefore, even if a part of the redundant load 40 fails, it is easy to exert the necessary function by using the remaining load.

The mobile power supply system 1 includes, as the normal power supplies, the auxiliary battery 21 and the electric power generator 22. Therefore, when the electric power stored in the auxiliary battery 21 or the redundant battery 41r is reduced, the auxiliary battery 21 or the redundant battery 41r can be charged by using the electric power generated by the electric power generator 22. As such, it is easy to suppress a situation in which the required power is insufficient and the electric power cannot be appropriately supplied to the redundant load 40.

After turning off the 1R switch 36r in S111, the 2R switch 37r is turned on in S112. In other words, the redundant battery 41r is separated from the first current path 31a in which the abnormality has occurred before the redundant battery 41r is connected to the second current path 32a that is functioning in normal. Therefore, the first current path 31a in which the abnormality has occurred can be quickly separated from the redundant battery 41r. As such, it is easy to suppress the redundant battery 41r from being significantly lost in power due to the abnormality occurred on the first current path 31a.

Second Embodiment

Hereinafter, the redundant battery 41r in the embodiment described above will be referred to as a first redundant battery 41r. The redundant current path 31r in the embodiment described above will be referred to as a first redundant current path 31r. The redundant current sensor 91 in the embodiment described above will be referred to as a first redundant current sensor 91.

The present embodiment is a modification in which the preceding embodiment is a base embodiment. In the present embodiment, the mobile power supply system 1 includes a first redundant battery 41r and a second redundant battery 42r. In addition, the mobile power supply system 1 includes a third current path 33a electrically conducted to a third electric power steering device 43a and a third camera 43b.

Figure 6:
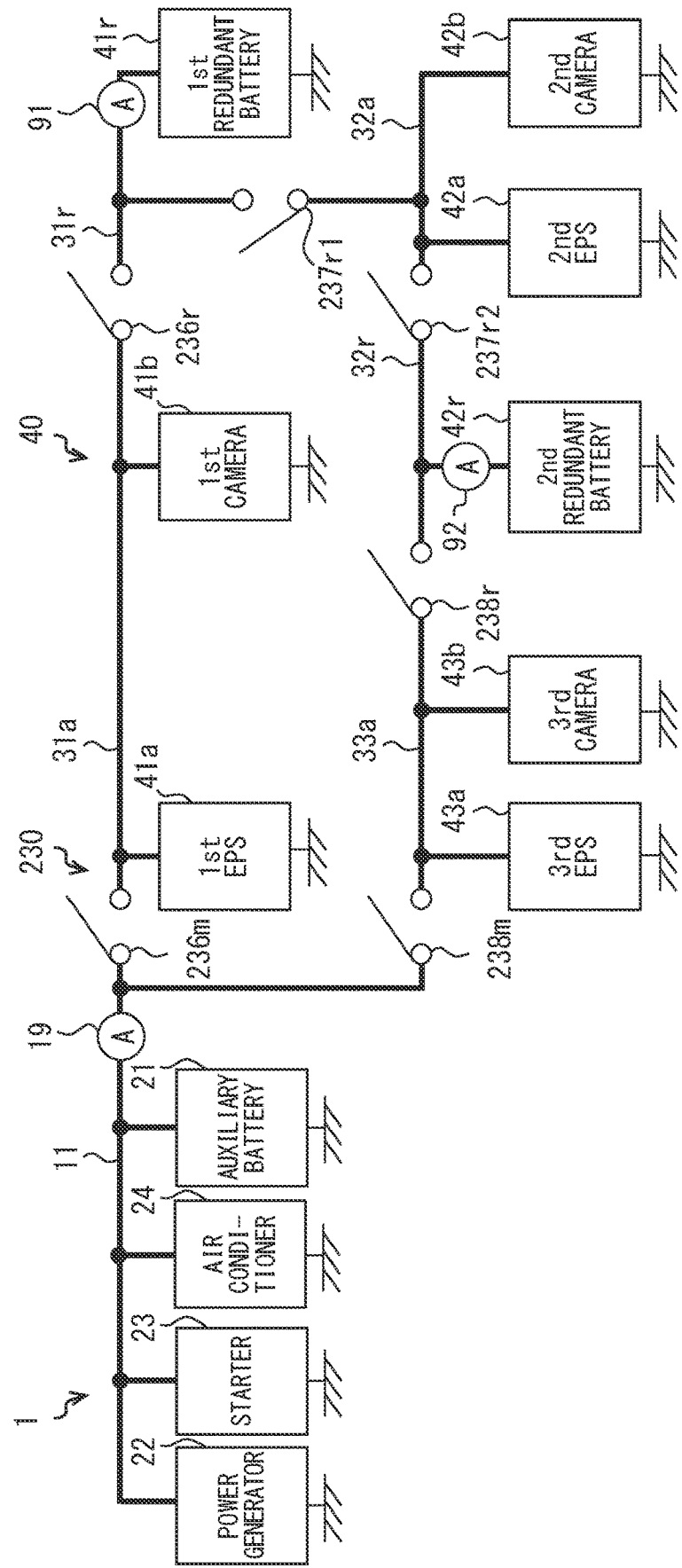
FIG. 6 is a diagram showing a schematic configuration of a power supply system for a mobile object according to a second embodiment.

As shown in FIG. 6, the mobile power supply system 1 includes a normal current path 11, a first current path 31a, a first redundant current path 31r, a second current path 32a, a second redundant current path 32r, and a third current path 33a.

The second redundant current path 32r and the third current path 33a are provided between the normal current path 11 and the first redundant current path 31r, and between the normal current path 11 and the second current path 32a.

A 1M switch 236m is provided between the normal current path 11 and the first current path 31a. The 1M switch 236m is a device that switches between an on state in which the normal current path 11 and the first current path 31a are connected to each other and an off state in which the normal current path 11 and the first current path 31a are separated from each other. A 1R switch 236r is provided between the first redundant current path 31r and the first current path 31a. The 1R switch 236r is a device that switches between an on state in which the first redundant current path 31r and the first current path 31a are connected and an off state in which the first redundant current path 31r and the first current path 31a are separated from each other. The 1M switch 236m provides an example of a first normal switch. The 1R switch 236r provides an example of a first redundant switch.

A 2R1 switch 237r1 is provided between the first redundant current path 31r and the second current path 32a. The 2R1 switch 237r1 is a device that switches between an on state in which the first redundant current path 31r and the second current path 32a are connected to each other and an off state in which the first redundant current path 31r and the second current path 32a are separated from each other. A 2R2 switch 237r2 is provided between the second redundant current path 32r and the second current path 32a. The 2R2 switch 237r2 is a device that switches between an on state in which the second redundant current path 32r and the second current path 32a are connected to each other and an off state in which the second redundant current path 32r and the second current path 32a are separated from each other. The 2R2 switch 237r2 switches the connection and separation between the normal current path 11 and the second current path 32a through another current path or switch. The 2R2 switch 237r2 provides an example of a second normal switch. The 2R1 switch 237r1 provides an example of a second redundant switch.

A 3M switch 238m is provided between the normal current path 11 and the third current path 33a. The 3M switch 238m is a device that switches between an on state in which the normal current path 11 and the third current path 33a are connected to each other and an off state in which the normal current path 11 and the third current path 33a are separated from each other. A 3R switch 238r is provided between the second redundant current path 32r and the third current path 33a. The 3R switch 238r is a device that switches between an on state in which the second redundant current path 32r and the third current path 33a are connected to each other and an off state in which the second redundant current path 32r and the third current path 33a are separated from each other. The 3M switch 238m provides an example of a second normal switch. The 3R switch 238r provides an example of a second normal switch.

The 1M switch 236m, the 1R switch 236r, the 2R1 switch 237r1, the 2R2 switch 237r2, the 3M switch 238m, and the 3R switch 238r constitute path switches 230 for switching the current paths. When all the path switches 230 are in the on states, the normal current path 11, the first current path 31a, the first redundant current path 31r, the second current path 32a, the second redundant current path 32r, and the third current path 33a form a looped current path. In other words, the normal current path 11, the first current path 31a, the first redundant current path 31r, the second current path 32a, the second redundant current path 32r, and the path switch 230 form a looped current path via other current paths.

A second redundant battery 42r is connected to the second redundant current path 32r. Further, no load is always connected to the second redundant current path 32r. A second redundant current sensor 92 that measures the magnitude of the current flowing from the second redundant battery 42r is connected to the second redundant current path 32r. The second redundant battery 42r is a battery whose performance such as rated voltage and storage capacity is substantially equal to that of the first redundant battery 41r. The second redundant current path 32r provides an example of a redundant current path. The second redundant battery 42r provides an example of a redundant battery.

The third electric power steering device 43a and the third camera 43b are connected to the third current path 33a. Hereinafter, the third electric power steering device 43a may also be referred to as a third EPS 43a. The third EPS 43a is a load including a motor that assists the steering force. The third camera 43b is an image-capturing device for the purpose of monitoring the surroundings of the vehicle. Alternatively, the surroundings of the vehicle may be monitored by using a LIDAR, in place of the third camera 43b. The third EPS 43a and the third camera 43b are loads that can receive electric power from both the auxiliary battery 21 and the second redundant battery 42r. The third EPS 43a provides an example of the third redundant load. The third camera 43b provides an example of a third redundant load.

The first EPS 41a, the second EPS 42a, and the third EPS 43a constitute a series of electric power steering device. The first EPS 41a, the second EPS 42a, and the third EPS 43a can exhibit the function an electric power steering device by using the remaining devices even if any one of which fails. That is, not only the power supply path is redundant, but also the load constituting the electric power steering device is redundant. In the normal state, all the loads of the first EPS 41a, the second EPS 42a, and the third EPS 43a are used so as to maintain favorable steering performance.

The first camera 41b, the second camera 42b, and the third camera 43b form a series of surroundings monitoring device. Even if any one of the first camera 41b, the second camera 42b and the third camera 43b fails, the function as the surroundings monitoring device can be achieved by the remaining cameras. That is, not only the power supply path is redundant, but also the load constituting the surrounding monitoring device is redundant. In the normal state, the surroundings monitoring performance is maintained in a good state by using all the loads of the first camera 41b, the second camera 42b, and the third camera 43b. The surrounding monitoring function may be redundantly configured by using different devices, such as an imaging device as the first camera 41b, the LIDAR as the second camera 42b, and a millimeter wave radar as the third camera 43b.

The first EPS 41a, the second EPS 42a, the third EPS 43a, the first camera 41b, the second camera 42b, and the third camera 43b provide a redundant load 40. In other words, the redundant load 40 includes a first redundant load, a second redundant load and a third redundant load. The first redundant load includes the first EPS 41a and the first camera 41b.

The second redundant load includes the second EPS 42a and the second camera 42b. The third redundant load includes the third EPS 43a and the third camera 43b.

In the mobile power supply system 1, when any of the current sensors 19, 91, and 92 detects a current of the predetermined value or more, a part of the path switches 230 is turned off. More specifically, the 1M switch 236m, the 2R1 switch 237r1 and the 3R switch 238r are turned off. On the other hand, the 1R switch 236r, the 2R2 switch 237r2, and the 3M switch 238m are kept in the on states. As a result, the first EPS 41a and the first camera 41b are connected to the first redundant battery 41r and are separated from the other power supplies. Further, the second EPS 42a and the second camera 42b are connected to the second redundant battery 42r and are separated from the other power supplies. The third EPS 43a and the third camera 43b are connected to the auxiliary battery 21 and the electric power generator 22 and are separated from the other power supplies. In this way, the power supplies are separated from each other, and made in states to supply electric power to respectively different redundant loads 40. In this state, it is specified to which current path the abnormal part belongs to based on the physical quantity such as the current value.

In the mobile power supply system 1, when the abnormal part is, for example, in the second EPS 42a, the 2R1 switch 237r1 and the 2R2 switch 237r2 are turned off. In addition, the 1M switch 236m, the 1R switch 236r, the 3M switch 238m and the 3R switch 238r are turned on. That is, the path switches 230 are controlled so as to separate the second current path 32a connected to the second EPS 42a, which is the abnormal part, from each power supply of the mobile power supply system 1. As a result, the auxiliary battery 21, the first redundant battery 41r, and the second redundant battery 42r can be used to stably supply electric power to the redundant load 40 excluding the second EPS 42a and the second camera 42b. Further, each battery can be charged by supplying the electric power generated by the electric power generator 22 to the auxiliary battery 21, the first redundant battery 41r, and the second redundant battery 42r.

According to the embodiment described above, in the mobile power supply system 1 having the second redundant battery 42r, which is a battery different from the first redundant battery 41r, the controller 50 controls the on and off states of the path switches 230. Therefore, the redundancy of the redundant load 40 can be increased by separating the current path in which the abnormality has occurred from each power supply of the mobile power supply system 1. Further, the auxiliary battery 21, the first redundant battery 41r, and the second redundant battery 42r can selectively supply electric power to a plurality of different loads. Therefore, the redundant load 40 receives electric power from a plurality of power supplies and can operate stably.

A switch or a current path other than the second redundant current path 32r and the third current path 33a may be provided between the normal current path 11 and the second current path 32a. That is, another load or power supply can be additionally connected to the looped current path. Therefore, even if the number and types of loads increase, the current path of the mobile power supply system 1 can be easily expanded.

Third Embodiment

The present embodiment is a modification in which the preceding embodiment is a base embodiment. In the present embodiment, the mobile power supply system 1 has a Y connection path 331 so as to form a plurality of looped current path.

Figure 7:
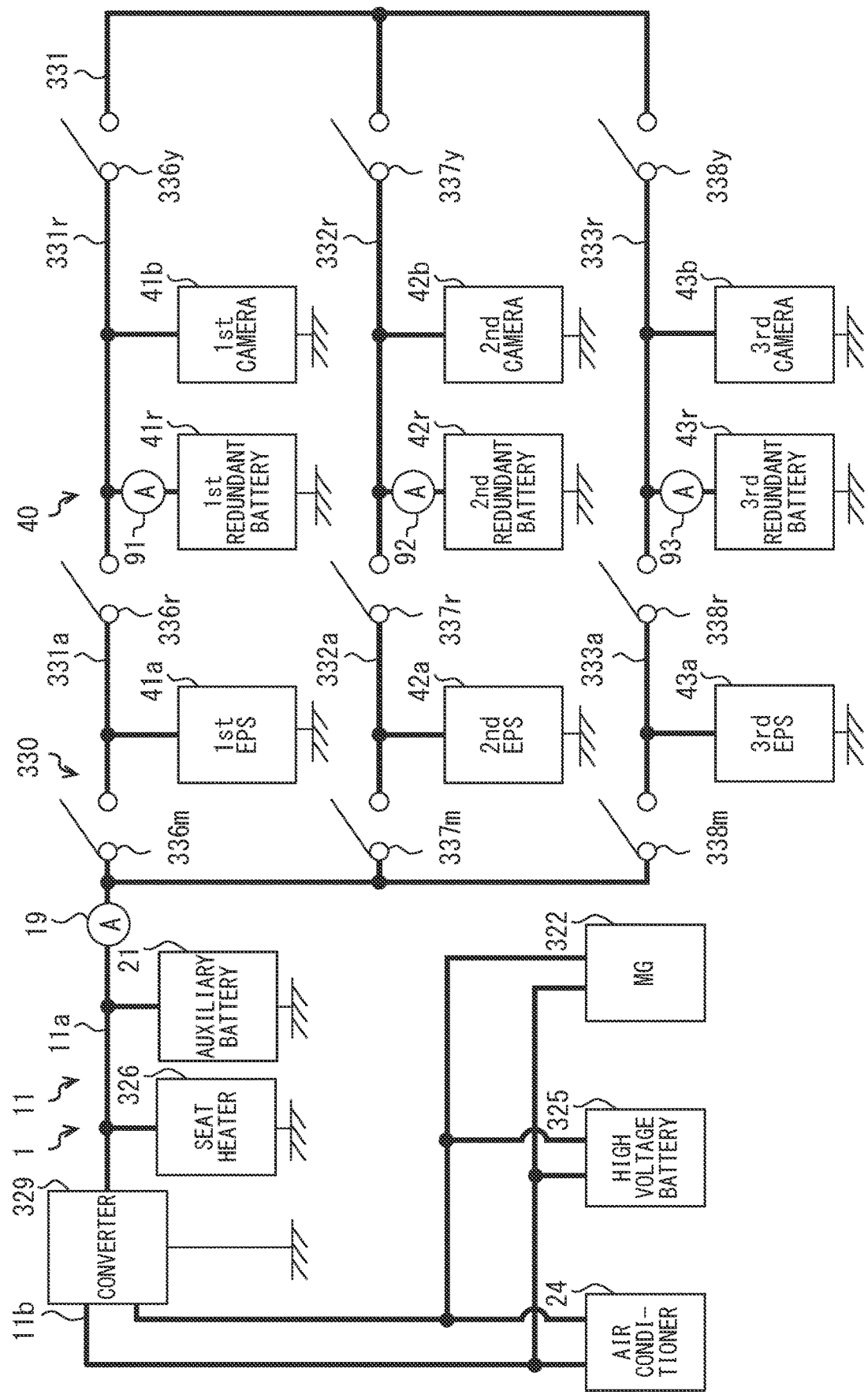
FIG. 7 is a diagram showing a schematic configuration of a power supply system for a mobile object according to a third embodiment.

As shown in FIG. 7, the mobile power supply system 1 includes a normal current path 11, a first current path 331a, a first redundant current path 331r, a second current path 332a, a second redundant current path 332r, a third current path 333a, a third redundant current path 333r and a Y connection path 331. The Y connection path 331 is a current path that is no provided with a load or a power supply. The first redundant current path 331r provides an example of a redundant current path. The second redundant current path 332r provides an example of a redundant current path.

The normal current path 11 includes a low voltage path 11a and a high voltage path 11b. The low voltage path 11a is, for example, a current path having a voltage of 12 V. The high voltage path 11b is, for example, a current path having a voltage of 300 V. The low voltage path 11a forms a circuit of a negative-side grounded system in which the positive terminal of the low voltage path 11a is connected through a wiring, and the negative terminal is connected by using a metal of a vehicle body. The high voltage path 11b includes two paths, that is, a positive path and a negative path. A converter 329 is provided between the low voltage path 11a and the high voltage path 11b. The converter 329 is a DC-to-DC converter that converts a DC voltage into a DC voltage having a different voltage value. The converter 329 steps down the high voltage of the high voltage path 11b to the low voltage of the low voltage path 11a.

A seat heater 326 is connected to the low voltage path 11a. The seat heater 326 is a heater for warming a seat. The seat heater 326 is an electric heater that converts the current flowing therein into heat, thereby to heat the seat. The seat heater 326 provides an example of a normal load.

The air conditioner 24, the motor generator 322, and the high voltage battery 325 are connected to the high voltage path 11b. Hereinafter, the motor generator 322 may be referred to as the MG 322. The high voltage battery 325 is mounted on a vehicle such as an electric vehicle, a hybrid vehicle, or a fuel cell vehicle. The high voltage battery 325 is a device that stores electric power to be supplied to the MG 322, which functions as a motor for travelling the vehicle. The high voltage battery 325 has a rated voltage of 300 V, for example. The high voltage battery 325 provides an example of a normal power supply.

The MG 322 has not only the function as the travelling motor but also has a function of generating electricity by utilizing regenerative energy generated when the vehicle is decelerated. The MG 322 is also referred to as a rotary electric machine. The DC voltage of the high voltage battery 325 is converted into an AC voltage by means of an inverter and supplied to the MG 322. The MG 322 provides an example of a normal power supply. The MG 322 provides an example of an electric power generator. The MG 322 provides an example of a prime mover.

The first current path 331a and the first redundant current path 331r are provided between the normal current path 11 and the Y connection path 331. The second current path 332a and the second redundant current path 332r are provided in parallel with the first current path 331a and the first redundant current path 331r, between the normal current path 11 and the Y connection path 331. The third current path 333a and the third redundant current path 333r are provided in parallel with the first current path 331a and the first redundant current path 331r, between the normal current path 11 and the Y connection path 331.

A 1M switch 336m is provided between the normal current path 11 and the first current path 331a. The 1M switch 336m is a device that switches between an on state in which the normal current path 11 and the first current path 331a are connected to each other and an off state in which the normal current path 11 and the first current path 331a are separated from each other. A 1R switch 336r is provided between the first redundant current path 331r and the first current path 331a. The 1R switch 336r is a device that switches between an on state in which the first redundant current path 331r and the first current path 331a are connected to each other and an off state in which the first redundant current path 331r and the first current path 331a are separated from each other. A 1Y switch 336y is provided between the first redundant current path 331r and the Y connection path 331. The 1Y switch 336y is a device that switches between an on state in which the first redundant current path 331r and the Y connection path 331 are connected to each other and an off state in which the first redundant current path 331r and the Y connection path 331 are separated from each other. The 1M switch 336m provides an example of a first normal switch. The 1R switch 336r provides an example of a first redundant switch.

A 2M switch 337m is provided between the normal current path 11 and the second current path 332a. The 2M switch 337m is a device that switches between an on state in which the normal current path 11 and the second current path 332a are connected to each other and an off state in which the normal current path 11 and the second current path 332a are separated from each other. A 2R switch 337r is provided between the second redundant current path 332r and the second current path 332a. The 2R switch 337r is a device that switches between an on state in which the second redundant current path 332r and the second current path 332a are connected to each other and an off state in which the second redundant current path 332r and the second current path 332a are separated from each other. A 2Y switch 337y is provided between the second redundant current path 332r and the Y connection path 331. The 2Y switch 337y is a device that switches between an on state in which the second redundant current path 332r and the Y connection path 331 are connected to each other and an off state in which the second redundant current path 332r and the Y connection path 331 are separated from each other. The 2M switch 337m provides an example of a second normal switch. The 2R switch 337r provides an example of a second redundant switch. A 3M switch 338m is provided between the normal current path 11 and the third current path 333a. The 3M switch 338m is a device that switches between an on state in which the normal current path 11 and the third current path 333a are connected to each other and an off state in which the normal current path 11 and the third current path 333a are separated from each other. A 3R switch 338r is provided between the third redundant current path 333r and the third current path 333a. The 3R switch 338r is a device that switches between an on state in which the third redundant current path 333r and the third current path 333a are connected to each other and an off state in which the third redundant current path 333r and the third current path 333a are separated from each other. A 3Y switch 338y is provided between the third redundant current path 333r and the Y connection path 331. The 3Y switch 338y is a device that switches between an on state in which the third redundant current path 333r and the Y connection path 331 are connected to each other and an off state in which the third redundant current path 333r and the Y connection path 331 are separated from each other. The 1Y switch 336y provides an example of a second redundant switch. The 2Y switch 337y provides an example of a second redundant switch.

The 1M switch 336m, the 1R switch 336r, the 1Y switch 336y, the 2M switch 337m, the 2R switch 337r, the 2Y switch 337y, the 3M switch 338m, the 3R switch 338r and the 3Y switch 338y provide the path switches 330. When all the path switches 330 are in the on states, the normal current path 11, the first current path 331a, the first redundant current path 331r, the second current path 332a, the second redundant current path 332r, the third current path 333a, and the third redundant current path 333r and the Y connection path 331 form plural looped current paths.

A first EPS 41a is connected to the first current path 331a. A first redundant battery 41r and a first camera 41b are connected to the first redundant current path 331r. A first redundant current sensor 91 that measures the magnitude of the current flowing from the first redundant battery 41r is connected to the first redundant current path 331r.

A second EPS 42a is connected to the second current path 332a. A second redundant battery 42r and a second camera 42b are connected to the second redundant current path 332r. A second redundant current sensor 92 is connected to the second redundant current path 332r. The second redundant current sensor 92 measures the magnitude of the current flowing from the second redundant battery 42r.

A third EPS 43a is connected to the third current path 333a. A third redundant battery 43r and a third camera 43b are connected to the third redundant current path 333r. The third redundant battery 43r is a battery whose performance such as rated voltage and storage capacity is substantially equal to that of the first redundant battery 41r and the second redundant battery 42r. A third redundant current sensor 93 is connected to the third redundant current path 333r. The third redundant current sensor 93 measures the magnitude of the current flowing from the third redundant battery 43r.

In the mobile power supply system 1, when any of the current sensors 19, 91, 92, and 93 detects a current of a predetermined value or more, a part of the path switches 330 is turned off. More specifically, the 1M switch 336m, the 1Y switch 336y, the 2M switch 337m, the 2Y switch 337y, the 3M switch 338m and the 3Y switch 338y are turned off. On the other hand, the 1R switch 336r, the 2R switch 337r, and the 3R switch 338r are maintained in the on states. As a result, the first EPS 41a and the first camera 41b are connected to the first redundant battery 41r and are separated from the other power supplies. Further, the second EPS 42a and the second camera 42b are connected to the second redundant battery 42r and are separated from other power supplies. Likewise, the third EPS 43a and the third camera 43b are connected to the third redundant battery 43r and are separated from other power supplies. The normal power supply such as the auxiliary battery 21 is not in the state of being connected to the redundant load 40. In this way, the power supplies are separated from each other, and in states to supply electric power to the respective redundant loads 40, which are different from each other. In this state, the position of an abnormality among the current paths, that is, which current path the abnormal part belongs to is specified from a physical quantity such as a current value.

In the mobile power supply system 1, for example, when the abnormal part is in the second EPS 42a, the 2M switch 337m and the 2R switch 337r are turned off, and the remaining path switches 330 are turned on. That is, the path switches 330 are controlled so as to separate the second current path 332a connected to the second EPS 42a, which includes the abnormal part, from each power supply of the mobile power supply system 1. As a result, the electric power can be supplied stably to the redundant load 40 excluding the second EPS 42a by using the normal power supply including the auxiliary battery 21, the first redundant battery 41r, the second redundant battery 42r, and the third redundant battery 43r. Further, each battery can be charged by supplying the electric power generated by the MG 322 to the auxiliary battery 21, the first redundant battery 41r, the second redundant battery 42r, the third redundant battery 43, and the high voltage battery 325.

According to the embodiment descried above, the first redundant battery 41r and the first camera 41b are always connected to each other. Therefore, the first camera 41b can always receive the electric power from the first redundant battery 41r. Therefore, it is less likely that the electric power will not be supplied to the first camera 41b due to an abnormality such as an open failure of the path switch 330.

The converter 329 is used to step down the high voltage of the high voltage battery 325 and supply the voltage to the redundant load 40. Therefore, the high voltage battery 325 can function as a power supply capable of supplying power to a load other than the load that requires a high voltage.

Fourth Embodiment

The present embodiment is a modification in which the preceding embodiment is a base embodiment. In the present embodiment, a part of the current paths is triangularly connected.

Figure 8:
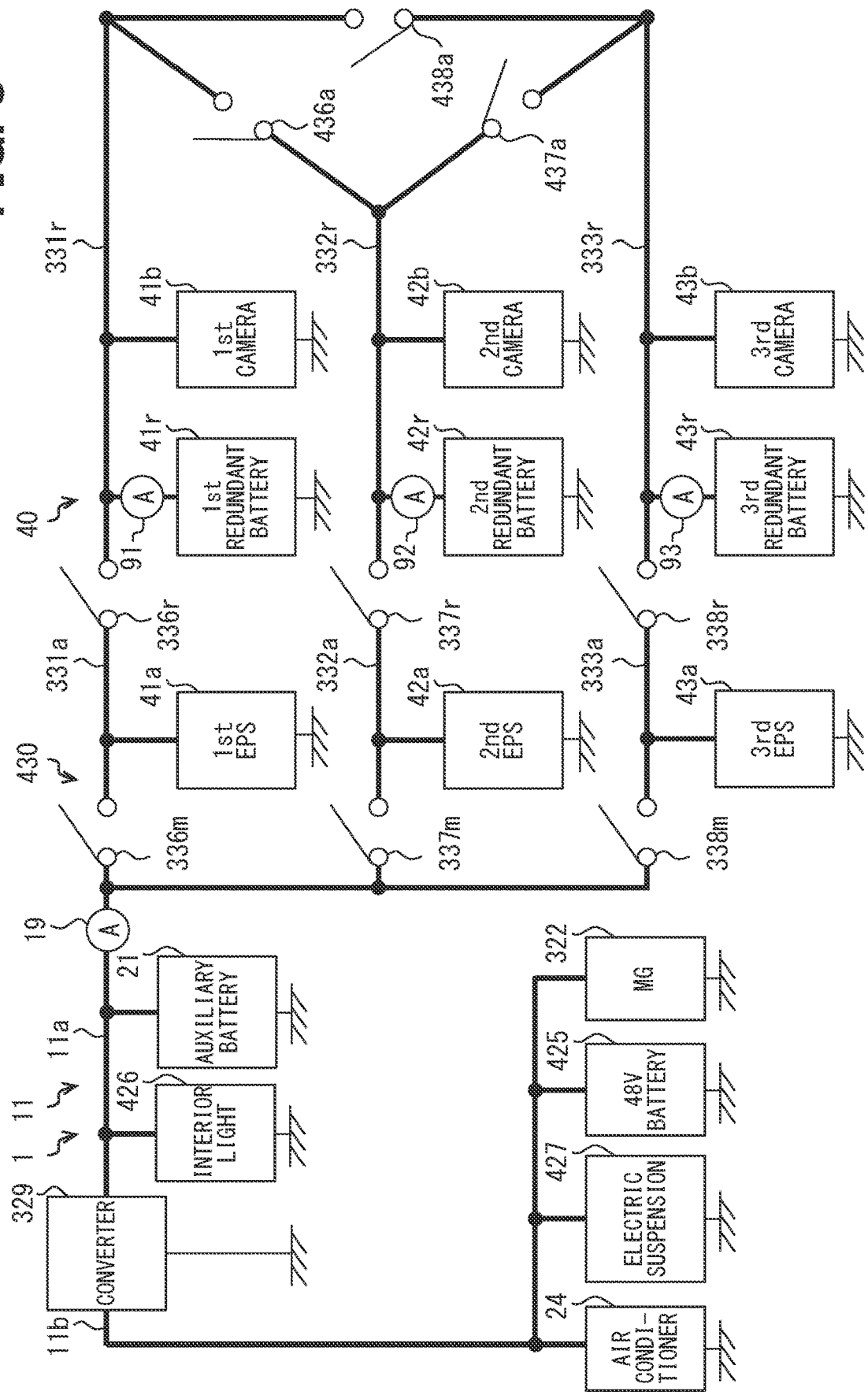
FIG. 8 is a diagram showing a schematic configuration of a power supply system for a mobile object according to a fourth embodiment.

As shown in FIG. 8, a 48V battery 425 and an electric suspension 427 are connected to a high voltage path 11b. The 48V battery 425 is a DC voltage source having a rated voltage of 48V. To a load driven by a voltage of 12 V such as an interior light 426, electric power is supplied from the auxiliary battery 21 which is a DC voltage source having a rated voltage of 12 V. On the other hand, to a load driven by a voltage of 48V such as an electric suspension 427, electric power is supplied from the 48V battery 425. However, the 48V battery 425 also supplies electric power to a load driven by a voltage of 12V, such as a seat heater 326, after stepping down the voltage to 12V through the converter 329. The electric suspension 427 is a device that electrically controls the damping force. The electric suspension 427 may include an electric stabilizer or the like, which is a device for reducing the roll of a vehicle body. The 48V battery 425 provides an example of a normal power supply. The interior light 426 provides an example of a normal load. The electric suspension 427 provides an example of a normal load.

In the current path of the mobile power supply system 1, a part of the first redundant current path 331r, a part of the second redundant current path 332r, and a part of the third redundant current path 333r are triangularly connected. That is, a first triangular switch 436a is provided between the first redundant current path 331r and the second redundant current path 332r. In addition, a second triangular switch 437a is provided between the second redundant current path 332r and the third redundant current path 333r. Further, a third triangular switch 438a is provided between the third redundant current path 333r and the first redundant current path 331r.

The 1M switch 336m, the 1R switch 336r, the first triangular switch 436a, the 2M switch 337m, the 2R switch 337r, the second triangular switch 437a, the 3M switch 338m, the 3R switch 338r and the third triangular switch 438a provide the path switches 430. When all the path switches 430 are in the on states, the normal current path 11, the first current path 331a, the first redundant current path 331r, the second current path 332a, the second redundant current path 332r, the third current path 333a, and the third redundant current path 333r form a plurality of looped current paths.

In the mobile power supply system 1, for example, when a ground fault occurs in the second camera 42b, the 2R switch 337r, the first triangular switch 436a, and the second triangular switch 437a are turned off, and the remaining path switches 430 are turned on. That is, the path switches 430 are controlled so as to separate the second redundant current path 332r connected to the second camera 42b, which has a ground fault, from each power supply of the mobile power supply system 1. As a result, the electric power can be stably supplied to the redundant load 40 excluding the second camera 42b by using the auxiliary battery 21, the first redundant battery 41r, and the third redundant battery 43r. Further, the electric power generated by the MG 322 can be supplied to the auxiliary battery 21, the first redundant battery 41r, the third redundant battery 43, and the 48V battery 425, to thereby charge the respective batteries 21, 41r, 43 and 425.

According to the embodiment described above, the part of the current path is triangularly connected. Therefore, even if the first triangular switch 436a fails and cannot be turned on, the first redundant current path 331r and the second redundant current path 332r can be made equipotential by turning on the second triangular switch 437a and the third triangular switch 438a.

Fifth Embodiment

The present embodiment is a modification in which the preceding embodiment is a base embodiment. In the present embodiment, electric power is supplied to a first EPS 41a via a first converter 541d.

Figure 9:
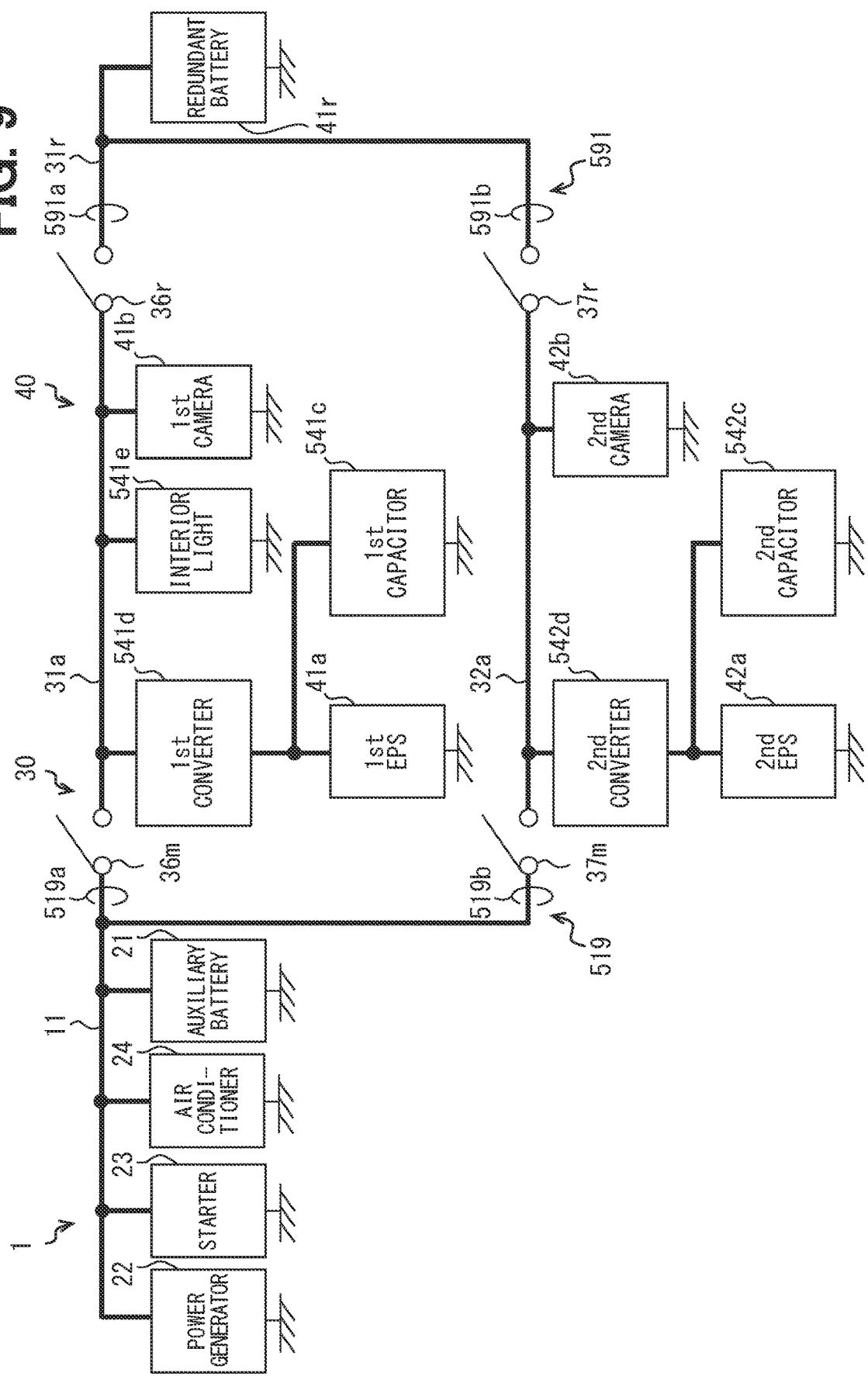
FIG. 9 is a diagram showing a schematic configuration of a power supply system for a mobile object according to a fifth embodiment.

As shown in FIG. 9, the first EPS 41a is connected to a first current path 31a via the first converter 541d. The mobile power supply system 1 includes a first capacitor 541c connected to a part between the first converter 541d and the first EPS 41a in the first current path 31a. The first converter 541d is a device that converts the voltage values output from an auxiliary battery 21, a redundant battery 41r, or an electric power generator 22. That is, the first converter 541d is a DC-to-DC converter that converts a DC voltage into a DC voltage having a different voltage value. The first converter 541d is a boost converter that boosts a DC voltage of 12 V to 48 V, for example. The first capacitor 541c is a component that temporarily stores electrical charges in order to stably supply the voltage of 48 V to the first EPS 41a. However, if the first converter 541d can stably output the electric power required for driving the first EPS 41a, the first capacitor 541c may not be provided.

A second EPS 42a is connected to a second current path 32a via a second converter 542d. Further, the mobile power supply system 1 includes a second capacitor 542c connected to a part between the second converter 542d and the second EPS 42a in the second current path 32a. The second converter 542d is a device that converts the voltage values output from the auxiliary battery 21, the redundant battery 41r, or the electric power generator 22. That is, the second converter 542d is a DC-to-DC converter that converts a DC voltage into a DC voltage having a different voltage value. The second converter 542d is a boost converter that boosts a DC voltage of 12 V to 48 V, for example. The second capacitor 542c is a component that temporarily stores electrical charges in order to stably supply a voltage of 48 V to the second EPS 42a. However, if the second converter 542d can stably output the electric power required for driving the second EPS 42*a*, the second capacitor 542*c* may not be provided. The first converter 541*d* and the second converter 542*d* provide an example of a converter.

An interior light 541*e* is connected to the first current path 31*a*. The interior light 541*e* is a load that does not need to increase redundancy. In other words, the interior light 541*e* is a load other than the redundant load 40. The interior light 541*e* and the redundant load 40 are connected side by side, and connected to the looped current path. When a ground fault occurs in the interior light 541*e*, a large amount of current flows toward the interior light 541*e*, so an appropriate amount of current does not flow to the first EPS 41*a* and the first camera 41*b*. That is, an abnormality that the first EPS 41*a* and the first camera 41*b* are not appropriately supplied with the electric power occurs. In addition, the power supply line of the first current path 31*a* may be grounded due to peeling of the coating of the power supply line forming the first current path 31*a*. Also in this case, a large amount of current flows toward the ground fault portion of the power supply line, so the current does not appropriately flow to the first EPS 41*a* and the first camera 41*b*. That is, an abnormality that the first EPS 41*a* and the first camera 41*b* are not appropriately supplied with the electric power occurs.

A first normal current sensor 519*a* is disposed corresponding to the 1M switch 36*m*. A second normal current sensor 519*b* is disposed corresponding to the 2M switch 37*m*. The first normal current sensor 519*a* and the second normal current sensor 519*b* provide a normal current sensor 519. A first redundant current sensor 591*a* is disposed corresponding to the 1R switch 36*r*. A second redundant current sensor 591*b* is disposed corresponding to the 2R switch 37*r*. The first redundant current sensor 591*a* and the second redundant current sensor 591*b* provide a redundant current sensor 591.

The normal current sensor 519 and the redundant current sensor 591 are magneto-electric conversion devices that convert a magnetic field into an electric current. The normal current sensor 519 and the redundant current sensor 591 are, for example, sensors using Hall elements. The normal current sensor 519 and the redundant current sensor 591 are provided in a substantially loop shape around the current path. Each of the normal current sensor 519 and the redundant current sensor 591 can detect the magnetic field generated by the current flowing in the current path, as an object to measure, to measure the magnitude of the current in a non-contact manner.

By providing the normal current sensor 519 and the redundant current sensor 591 correspondingly to the plurality of path switches 30, it is possible to quickly determine the current path in which the abnormality has occurred by using the plurality of current sensors. Further, in place of the current sensors such as the normal current sensor 519, a physical quantity other than the electric current may by measured to determine whether or not an abnormality has occurred.

According to the embodiment described above, the mobile power supply system 1 includes the first converter 541*d* and the second converter 542*d*. Therefore, the magnitude of the voltage to supply can be individually changed for the plurality of loads providing the redundant load 40. As such, it is not necessary to separately provide a current path or a power supply for loads having different required voltages. Accordingly, it is possible to provide the mobile power supply system 1 having a simple configuration and ensuring redundancy. Further, each of the above-mentioned current sensors 519*a*, 519*b*, 591*a*, and 591*b* can adopt a configuration such as a configuration of measuring the voltage across a shunt resistor inserted in series with the path switch 30, other than the sensor using the Hall element. In such a case, each of the current sensors 519*a*, 519*b*, 591*a*, and 591*b* can be provided by a simple configuration.

Sixth Embodiment

The present embodiment is a modification in which the preceding embodiment is a base embodiment. In the present embodiment, a first redundant battery 41*r* is always connected to a first current path 31*a*, and a second redundant battery 42*r* is always connected to a second current path 32*a*.

Figure 10:
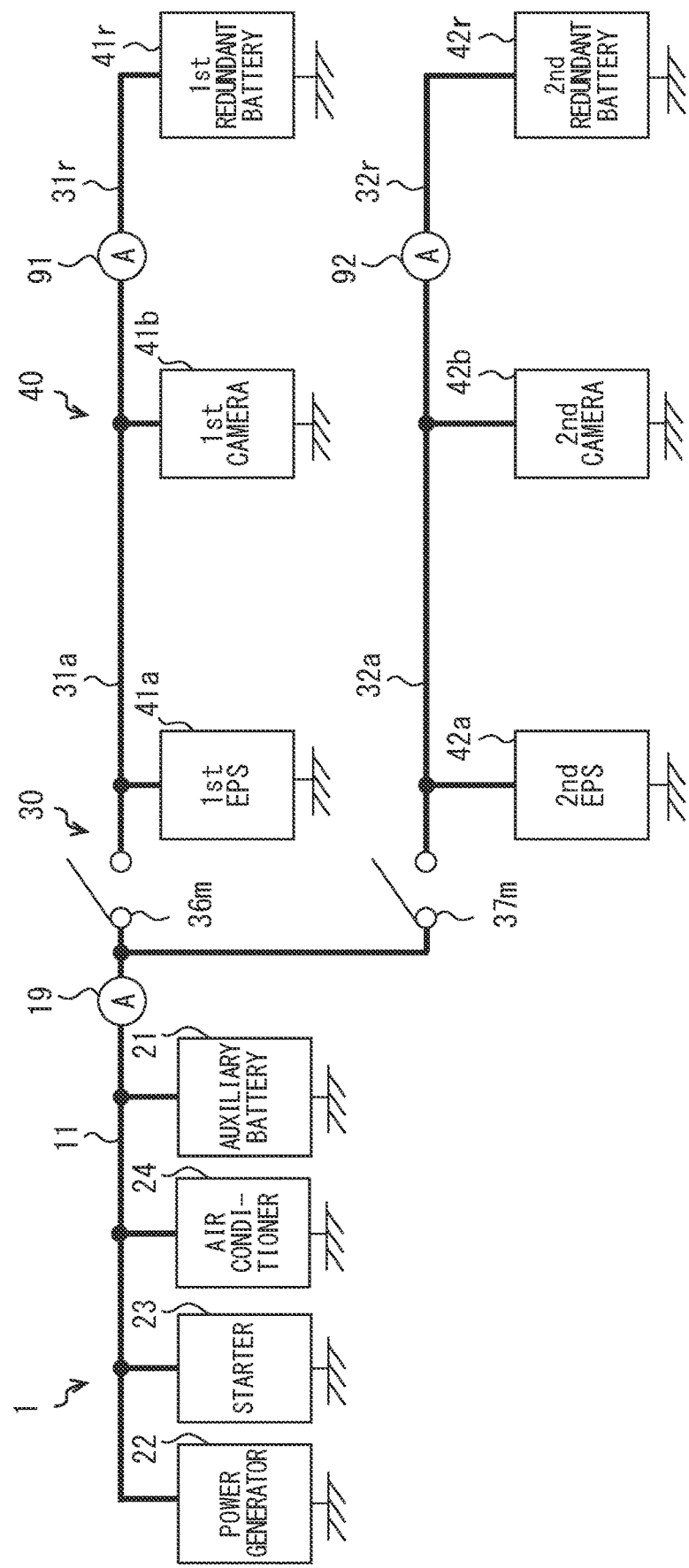
FIG. 10 is a diagram showing a schematic configuration of a power supply system for a mobile object according to a sixth embodiment.

As shown in FIG. 10, a first redundant battery 41*r* is connected to the first current path 31*a*, in addition to a first EPS 41*a* and a first camera 41*b*. In other words, the first current path 31*a* and the first redundant current path 31*r* form a continuous current path. The first EPS 41*a* and the first camera 41*b* are always connected to the first redundant battery 41*r*.

A second redundant battery 42*r* is connected to the second current path 32*a*, in addition to a second EPS 42*a* and a second camera 42*b*. In other words, the second current path 32*a* and the second redundant current path 32*r* form a continuous current path. The second EPS 42*a* and the second camera 42*b* are always connected to the second redundant battery 42*r*. The path switches 30 are provided by two switches, a 1M switch 36*m* and a 2M switch 37*m*.

When no abnormality has occurred in the mobile power supply system 1, the 1M switch 36*m* and the 2M switch 37*m* are in the on states. Therefore, the normal current path 11, the first current path 31*a*, and the second current path 32*a* are in an electrically conducted state. In this electrically conducted state, a redundant load 40 receives electric power from the auxiliary battery 21, the electric power generator 22, the first redundant battery 41*r*, and the second redundant battery 42*r*.

In the mobile power supply system 1, for example, when a ground fault occurs in the second EPS 42*a*, the 2M switch 37*m* is turned off and the 1M switch 36*m* is turned on. That is, the path switches 30 are controlled so as to separate the second current path 32*a* connected to the second EPS 42*a*, which has a ground fault, from the auxiliary battery 21 and the first redundant battery 41*r* of the mobile power supply system 1. As a result, electric power can be stably supplied to the first EPS 41*a* and the first camera 41*b* by using the auxiliary battery 21 and the first redundant battery 41*r*. Further, by supplying the electric power generated by the electric power generator 22 to the auxiliary battery 21 and the first redundant battery 41*r*, it is possible to charge the battery used for driving the first EPS 41*a* and the first camera 41*b*.

According to the embodiment described above, the normal current path 11 and the first current path 31*a* are connected to be separable via the 1M switch 36*m*. Further, the normal current path 11 and the second current path 32*a* are connected to be separable via the 2M switch 37*m*. Therefore, the loads connected to the auxiliary battery 21 and the electric power generator 22 can be easily switched by controlling the 1M switch 36*m* and the 2M switch 37*m*. As such, it is possible to separate the abnormal load, among the redundant loads 40, from the auxiliary battery 21 and to supply electric power to the remaining redundant load 40, which is in normal, by using the auxiliary battery 21 and the electric power generator 22. Therefore, it is possible to provide the mobile power supply system 1 having a simple configuration and enhanced redundancy, as compared with the case where the auxiliary battery 21 and the electric power generator 22 are not used as the power supplies for supplying electric power to the redundant load 40, In the case of the configuration described above, if the 1M switch 36*m* has an open fault, the first redundant battery 41*r* cannot be charged. As a countermeasure, it is possible to secure redundancy by forming the 1M switch 36*m* with a plurality of switches connected in parallel. The target for increasing the redundancy is not limited to the 1M switch 36*m*, and it may be possible to form the 2M switch 37*m* so as to enhance the redundancy.

Seventh Embodiment

The present embodiment is a modification in which the preceding embodiment is a base embodiment. In the present embodiment, a first current path 31*a* and a second current path 32*a* are provided in parallel with each other.

Figure 11:
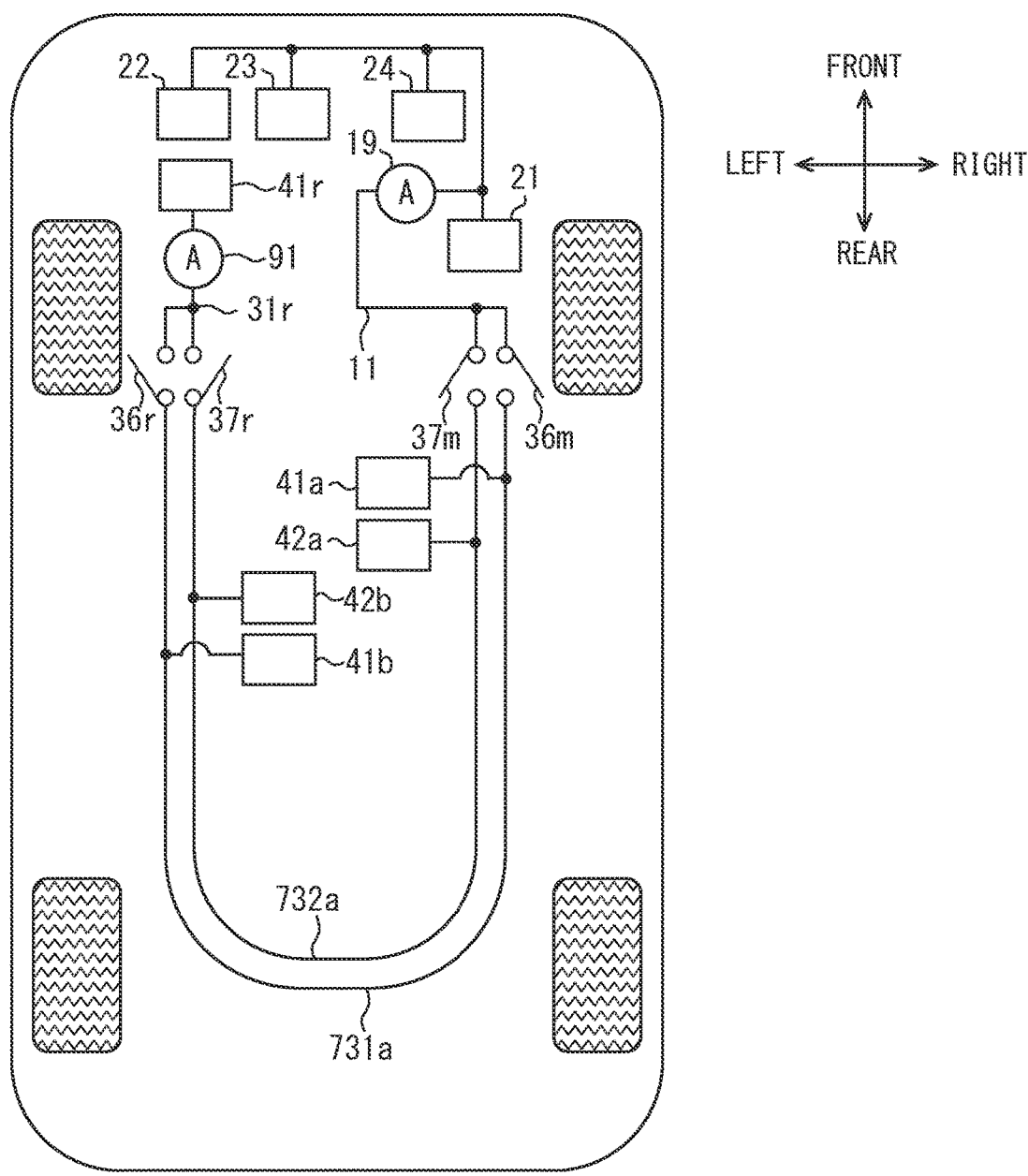
FIG. 11 is a diagram showing a power supply system for a mobile object according to a seventh embodiment, in a state of being mounted on a vehicle.

As shown in FIG. 11, the normal current path 11 and the redundant current path 31*r* are provided in a front part of the vehicle. The first current path 731*a* and the second current path 732*a* are provided to continuously extend from a front right part of the vehicle to a front left part of the vehicle via the rear part of the vehicle. Each of the first current path 731*a* and the second current path 732*a* forms a U-shaped current path.

The first current path 731*a* and the second current path 732*a* are arranged to be kept equidistant from each other. In other words, the first current path 731*a* and the second current path 732*a* are arranged parallel to each other over the entire length. The second current path 732*a* is arranged on an inner side the first current path 731*a*. It is not always necessary that the first current path 731*a* and the second current path 732*a* are arranged exactly parallel to each other. Further, it is not always necessary that the first current path 731*a* and the second current path 732*a* are arranged substantially parallel to each other over the entire length. For example, the first current path 731*a* and the second current path 732*a* may partially intersect. In a case where the first current path 731*a* and the second current path 732*a* are not parallel at a part, it is preferable that the length of the part where the first current path 731*a* and the second current path 732*a* are parallel is longer than the length of the part where the first current path 731*a* and the second current path 732*a* are not parallel. The first current path 731*a* and the second current path 732*a* may be arranged to be separated at a substantially equal interval in the vertical direction, instead of being separated at the substantially equal interval in the left-right direction or the front-rear direction.

The path length of the second current path 732*a* is slightly shorter than the path length of the first current path 731*a*. However, the difference between the path length of the first current path 731*a* and the path length of the second current path 732*a* is 50% or less of the average value of the path length of the first current path 731*a* and the path length of the second current path 732*a*.

According to the embodiment described above, the first current path 731*a* and the second current path 732*a* are arranged at positions parallel to each other. Therefore, the bending state is substantially the same between the first current path 731*a* and the second current path 732*a*. Therefore, it is easy to design the first current path 731*a* and the second current path 732*a* to have a substantially equal inductance value. Therefore, it is easy to reduce the loss generated by the circulation of the transient current.

Other Embodiments

The present disclosure in this specification, the drawings, and the like is not limited to the exemplified embodiments. The present disclosure encompasses the above-described embodiments and modifications based on the embodiments by those skilled in the art. For example, the present disclosure is not limited to the combinations of components and/or elements shown in the embodiments. The present disclosure may be implemented in various combinations. The present disclosure may have additional parts that may be added to the embodiments. The present disclosure encompasses omission of components and/or elements of the embodiments. The present disclosure encompasses the replacement or combination of components and/or elements between one embodiment and another. The disclosed technical scope is not limited to the description of the embodiments. It should be understood that some disclosed technical ranges are indicated by description of claims, and includes every modification within the equivalent meaning and the scope of description of claims.

Here, the flowchart described in the specification and the drawings, or the process of the flowchart is composed of a plurality of sections (or referred to as steps), and each section is expressed as, for example, S101. Each section may be divided into several subsections, while several sections may be combined into one section. Furthermore, each section thus configured may be referred to as a circuit, device, module, means or portion.

What is claimed is:

1. A power supply system for a mobile object, comprising:
a normal power supply that is configured to supply electric power to a normal load;
a normal current path that is connected to the normal power supply;
a redundant power supply that is a power supply different from the normal power supply, and configured to supply electric power to a redundant load, the redundant load including a first redundant load and a second redundant load;
a redundant current path that is connected to the redundant power supply;
a first current path that is provided between the normal current path and the redundant current path, and connected to the first redundant load;
a second current path that is disposed in parallel with the first current path, between the normal current path and the redundant current path, and connected to the second redundant load;
a path switch that includes a first normal switch, and a second normal switch, the first normal switch configured to switch a state of connection between the normal current path and the first current path, the second normal switch configured to switch a state of connection between the normal current path and the second current path; and
a controller that is configured to control to turn on and off the path switch, wherein
the normal power supply is connected to the normal load, and is connectable to at least one of the first redundant load and the second redundant load,
the path switch includes a first redundant switch that switches a state of connection between the redundant current path and the first current path, and a second redundant switch that switches a state of connection between the redundant current path and the second current path, and
the normal current path, the redundant current path, the first current path, and the second current path are connected to each other to provide a looped current path via the path switch.

2. The power supply system according to claim 1, wherein the first current path has an inductance a value of which is closer to an inductance of the second current path than an inductance of a part of the normal current path from the first normal switch to the second normal switch.

3. The power supply system according to claim 2, wherein the first current path and the second current path are arranged symmetrically with respect to a virtual line passing through a center of the mobile object in a front-rear direction of the mobile object.

4. The power supply system according to claim 2, wherein the first current path and the second current path are arranged parallel to each other.

5. The power supply system according to claim 1, wherein in response to detecting an abnormality that one of the first redundant load and the second redundant load fails to receive the electric power, the controller controls the path switch to separate the normal power supply and the redundant power supply from each other, and to connect the one of the first redundant load and the second redundant load to one of the normal power supply and the redundant power supply and the other of the first redundant load and the second redundant load to the other of the normal power supply and the redundant power supply.

6. The power supply system according to claim 1, wherein in response to detecting an abnormality in the first redundant load, the controller turns off the first normal switch and the first redundant switch, and turns on the second normal switch and the second redundant switch.

7. The power supply system according to claim 1, wherein the normal power supply is always connected to the normal load, and
the redundant power supply is connectable to at least one of the first redundant load and the second redundant load in a state of being separated from the normal load.

8. A power supply system for a mobile object, comprising:
a normal power supply that is configured to supply electric power to a normal load;
a normal current path that is connected to the normal power supply;
a redundant power supply that is a power supply different from the normal power supply, and configured to supply electric power to a redundant load, the redundant load including a first redundant load and a second redundant load;
a redundant current path that is connected to the redundant power supply;
a first current path that is provided between the normal current path and the redundant current path, and connected to the first redundant load;
a second current path that is disposed in parallel with the first current path, between the normal current path and the redundant current path, and connected to the second redundant load;
a path switch that includes a first normal switch, and a second normal switch, the first normal switch configured to switch a state of connection between the normal current path and the first current path, the second normal switch configured to switch a state of connection between the normal current path and the second current path; and
a controller that is configured to control to turn on and off the path switch, wherein
the normal power supply is connected to the normal load, and is connectable to at least one of the first redundant load and the second redundant load,
the normal power supply includes an auxiliary battery storing electric power to be supplied to the normal load, and
the redundant power supply includes a redundant battery having a storage capacity smaller than that of the auxiliary battery.

9. The power supply system according to claim 8, wherein the normal power supply includes an electric power generator generating electric power to be supplied to the normal load, in addition to the auxiliary battery.

10. A power supply system for a mobile object, comprising:
a normal power supply that is configured to supply electric power to a normal load;
a normal current path that is connected to the normal power supply;
a redundant power supply that is a power supply different from the normal power supply, and configured to supply electric power to a redundant load, the redundant load including a first redundant load and a second redundant load;
a redundant current path that is connected to the redundant power supply;
a first current path that is provided between the normal current path and the redundant current path, and connected to the first redundant load;
a second current path that is disposed in parallel with the first current path, between the normal current path and the redundant current path, and connected to the second redundant load;
a path switch that includes a first normal switch, and a second normal switch, the first normal switch configured to switch a state of connection between the normal current path and the first current path, the second normal switch configured to switch a state of connection between the normal current path and the second current path; and
a controller that is configured to control to turn on and off the path switch, wherein
the normal power supply is connected to the normal load, and is connectable to at least one of the first redundant load and the second redundant load,
the redundant load includes a mobile load that does not require power supply in a state where a prime mover used for moving the mobile object is not driven, and a regular load that requires power supply regardless of driving of the prime mover, and
the power supply system further comprises:
a power distribution device that is configured to allow electric power supply to the normal load while prohibiting the electric power supply to the mobile load when a key switch is in an accessory state, and to allow the electric power supply to both the mobile load and the regular load when the key switch is in an ignition state.

11. The power supply system according to claim 10, wherein
the power distribution device includes an ignition relay, an accessory relay, and a power distribution control unit,
the power distribution control unit is configured to receive a transition signal output from the key switch via a signal line, the power distribution control unit turns off the ignition relay and turns on the accessory relay, in response to receiving the transition signal indicating the accessory state, and the power distribution control unit turns on both the ignition relay and the accessory relay, in response to receiving the transition signal indicating the ignition state.

12. The power supply system according to claim 1, further comprising:

a converter that is configured to convert a magnitude of a voltage to be supplied to the redundant load.

* * * * *